(12) United States Patent
Takada

(10) Patent No.: US 8,077,858 B2
(45) Date of Patent: Dec. 13, 2011

(54) ECHO CANCELER AND ECHO CANCELING METHOD

(75) Inventor: Masashi Takada, Yokohama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 410 days.

(21) Appl. No.: 12/320,975

(22) Filed: Feb. 10, 2009

(65) Prior Publication Data

US 2009/0232297 A1 Sep. 17, 2009

(30) Foreign Application Priority Data

Mar. 12, 2008 (JP) .................................. 2008-063086

(51) Int. Cl.
*H04M 9/08* (2006.01)
*A61F 11/06* (2006.01)
*H04B 1/38* (2006.01)
(52) U.S. Cl. ................. 379/406.08; 381/71.11; 455/570
(58) Field of Classification Search .................... None
See application file for complete search history.

(56) References Cited

U.S. PATENT DOCUMENTS

| | | | |
|---|---|---|---|
| 5,295,136 A * | 3/1994 | Ashley et al. ................. 370/290 |
| 5,740,242 A | 4/1998 | Hayashi | |
| 5,909,384 A * | 6/1999 | Tal et al. ...................... 708/322 |
| 6,269,161 B1 * | 7/2001 | McLaughlin et al. ... 379/406.01 |
| 6,570,986 B1 * | 5/2003 | Wu et al. .................. 379/406.09 |
| 6,697,486 B1 * | 2/2004 | Takada ...................... 379/406.01 |
| 2004/0086109 A1 * | 5/2004 | Takada ...................... 379/406.08 |

FOREIGN PATENT DOCUMENTS

| | | |
|---|---|---|
| EP | 1111806 A2 | 6/2001 |
| JP | 63-238727 | 10/1988 |
| JP | 5-014246 A | 1/1993 |
| JP | 08-237174 | 9/1996 |
| JP | 2003-110469 | 4/2003 |
| WO | WO-98/15901 A1 | 4/1998 |

* cited by examiner

*Primary Examiner* — Fan Tsang
*Assistant Examiner* — Jeffrey Lytle
(74) *Attorney, Agent, or Firm* — Rabin & Berdo, P.C.

(57) ABSTRACT

An echo canceler uses an adaptive filter to remove an echo of an incoming far-end signal from an outgoing near-end signal in the presence of ambient noise, updating the filter coefficients while the far-end signal is active and the near-end signal is inactive. The near-end and far-end signals are also sampled to obtain data vectors, which are averaged to generate simulated near-end and far-end signals, from which substitute filter coefficients are calculated and updated while the far-end signal is silent, the substitute filter coefficients being used when the far-end signal becomes active again. The number of data vectors averaged is varied according to the ratio of echo power to ambient near-end noise power, or according to the echo attenuation ratio, thereby speeding up convergence of the filter coefficients. Data sampled while the near-end and far-end signals are both active are excluded from the updating process.

20 Claims, 8 Drawing Sheets

ECHO CANCELER AND ECHO CANCELING METHOD

BACKGROUND OF THE INVENTION

1. Field of the Invention

The present invention relates to an echo canceler and an echo canceling method and program, and is applicable to an echo canceler and an echo canceling method and program used in a hands-free speakerphone in, for example, a corporate conference room or an ordinary home.

2. Description of the Related Art

With the recent proliferation of voice over Internet protocol (VoIP) telephony and a wide variety of cellular phone services, the telephone rates for many types of telephone sets have come down and people can make telephone calls from their homes and offices with reduced concern about telephone bills. As a result, in many cases the calls last longer. This has led to a sudden rise in the demand for hands-free speakerphones for use in, for example, corporate conference rooms and ordinary homes.

A speakerphone has two effects: one effect is to free the user's hands to do other work during the call, and another effect is to enable long calls to be made without physical distress. Hands-free telephone sets that provide the first effect by employing earphone-microphones, headphones, or headsets are also known.

Because hands-free telephone sets free the hands to do other work during the call, hands-free telephone sets are mounted in automobiles and are used in offices. Hands-free telephone sets of the earphone (earphone-microphone), headphone, and headset type are also a familiar sight in call centers, even though earphones rub against the ear canal and can cause painful inflammation, while headsets and headphones cause irritation and fatigue if worn for a long time.

As long telephone calls made from the home become increasingly common, although the need to be able to drive a car or perform other tasks while making a call remains a significant factor, the need simply to be able to make long calls in comfort has become increasingly important. Differing from a mobile telephone user, a VoIP user expects to be able to relax during a long call and be free of physical as well as financial stress.

The most popular type of hands-free telephone set is the speakerphone, which employs a loudspeaker instead of an earphone or headphones.

An essential part of a speakerphone is an acoustic echo canceler that removes the echo of the acoustic output of the loudspeaker from the signal input through the microphone.

An essential part of an acoustic echo canceler is its adaptive filter, which has tap coefficients that mimic the effect of the acoustic echo path. A key part of the adaptive filter is the algorithm used to update the tap coefficients for optimum echo cancellation.

Many acoustic echo cancelers employ the normalized least mean squares (NLMS) algorithm, described by Haykin in *Introduction to Adaptive Filters* (Macmillan, June 1984, Japanese translation published by Gendaikogakusha, September 1987). The NLMS algorithm has the advantage of excellent stability and a comparatively small computational load on a digital signal processor, which offsets its disadvantages of relatively slow convergence for so-called 'colored signals' with a non-flat frequency spectrum. Voice signals are typically colored in this sense.

Although the NMLS algorithm remains an excellent choice for some purposes, the purposes for which speakerphones are needed are diversifying. In the past, speakerphones mainly had to satisfy the demands of hands-free use in corporate conference-room systems, in which system size and cost were not major considerations. Now there is also a need for high-performance speakerphones that are small and inexpensive enough to be used in ordinary homes. In addition, the spread of VoIP has led to the introduction of wideband telephony, which provides better speech quality than conventional telephony, so speakerphones and their adaptive filters must also be able to deal with wideband voice signals.

If the conventional NLMS filter updating algorithm is applied in an echo canceler for wideband telephony, problems arise in relation to both stability and computational load.

These problems arise from the increased sampling rate. If the signal bandwidth is doubled, for example, then the sampling rate also doubles, from the conventional eight thousand samples per second (8 kHz) to sixteen thousand samples per second (16 kHz), so twice as much data must be processed per unit time.

In contrast, the temporal length or impulse response length of the echo path from the speaker to the microphone is determined by physical factors such as the distance between the speaker and the microphone, the speed of sound, the number of different echo paths, and the presence of reflections, and is independent of the sampling rate.

Therefore, if the sampling rate rises, the necessary number of tap coefficients in the adaptive filter (the tap length of the filter) increases and the convergence speed of the adaptive filter is slowed accordingly.

Haykin discloses methods of speeding up the convergence of the NLMS algorithm, but these methods require complex calculations, imposing an increased computational load and requiring increased computational resources, including increased memory capacity. They also compromise the stability of filter. In short, these methods are expensive, requiring extra hardware and software, and they produce unreliable speech quality.

Continued use of the conventional NLMS algorithm for wideband adaptive filtering is also problematic, however. Due to the existing performance problems of this algorithm for colored signals and its decreased convergence speed due to increased tap length, speech quality is degraded by unremoved echo.

In Japanese Patent Application Publication No. 08-237174, Igai discloses a method of overcoming these problems by continuous optimization of the step gain in the NLMS algorithm. A large initial step gain is employed, so that the algorithm starts by converging quickly. As convergence progresses, the step gain is reduced so that the algorithm can model the echo accurately under steady-state conditions.

Continuous optimization of the step gain, however, fails to solve the problem of poor convergence for colored signals, and introduces new problems. For example, if voice input is preceded by a call control tone as described in *Telephone Service Interfaces Edition* 5, published by the Nippon Telegraph and Telephone Corporation (NTT), and if the algorithm converges while the call control tone is being received, then the reduced step size delays adaptation to the echo characteristics of the voice signal.

In Japanese Patent Application No. 2007-288404, filed by the present applicant, an attempt is made to solve these problems by providing an echo canceler that uses the stable NLMS algorithm to update the tap coefficients, but also converges rapidly.

If the method disclosed in Japanese Patent Application No. 2007-288404 is applied to speakerphones, however, the method disclosed by Tsujikado et al. in Japanese Examined Patent Application Publication No. H08-021881 (formerly Japanese Unexamined Patent Application Publication No. S63-238727, now Japanese Patent No. 2105375) may fail to produce the effects described by Tsujikado et al. when used in the presence of automobile engine noise, street noise, crowd noise, office noise, or other types of ambient noise.

SUMMARY OF THE INVENTION

An object of the invention is to improve echo cancellation performance by simulation, using a comparatively simple and stable algorithm.

Another object of the invention is to improve echo cancellation performance in the presence of ambient noise.

The invention provides a method of removing an echo of a far-end input signal from a near-end input signal by generating an echo replica from the far-end input signal and subtracting the echo replica signal from the near-end input signal to obtain a near-end output signal. The method includes:

detecting an active state and a silent state of the far-end input signal;

detecting a single-talk state, a double-talk state, and a silent state from the far-end input signal and the near-end output signal;

performing normal adaptive filter operations to generate the echo replica signal while the far-end input signal is active;

performing silent adaptive filter operations to simulate the normal adaptive filter operations while the far-end input signal is inactive;

controlling the normal adaptive filter operations and the silent adaptive filter operations according to the active state and the silent state;

calculating an ambient near-end noise power from the near-end output signal when the silent state is detected;

detecting an echo power from the near-end output signal in the single-talk state; and calculating a number of vectors to be averaged from an average value of the ambient near-end noise power and an average value of the echo power.

The silent adaptive filter operations include:

sampling the near-end input signal and the far-end input signal at prescribed intervals for a prescribed duration starting from a transition from the silent state to the active state to obtain samples;

storing the samples temporarily;

generating data vectors from the temporarily stored samples;

averaging the calculated number of data vectors to be averaged to generate an averaged far-end input vector and an averaged near-end input vector, convolving the averaged far-end input vector with a coefficient vector to generate a simulated echo replica signal, subtracting the simulated echo replica signal from the averaged near-end input vector to obtain a simulated residual signal, updating the coefficient vector according to the simulated residual signal, supplying the updated coefficient vector for use in the normal adaptive filter operations, and halting updating of the coefficient vector in the double-talk state.

This method permits the use of a comparatively simple and stable algorithm such as the NLMS algorithm for all coefficient updating operations.

Echo canceling performance in the present of ambient noise can be improved by increasing the number of vectors averaged to generate the averaged near-end and far-end input vectors.

The invention also provides an echo canceler employing the above method, and a machine-readable medium storing a program executable by a computing device to carry out the above method.

DETAILED DESCRIPTION OF THE INVENTION

Figure 1:
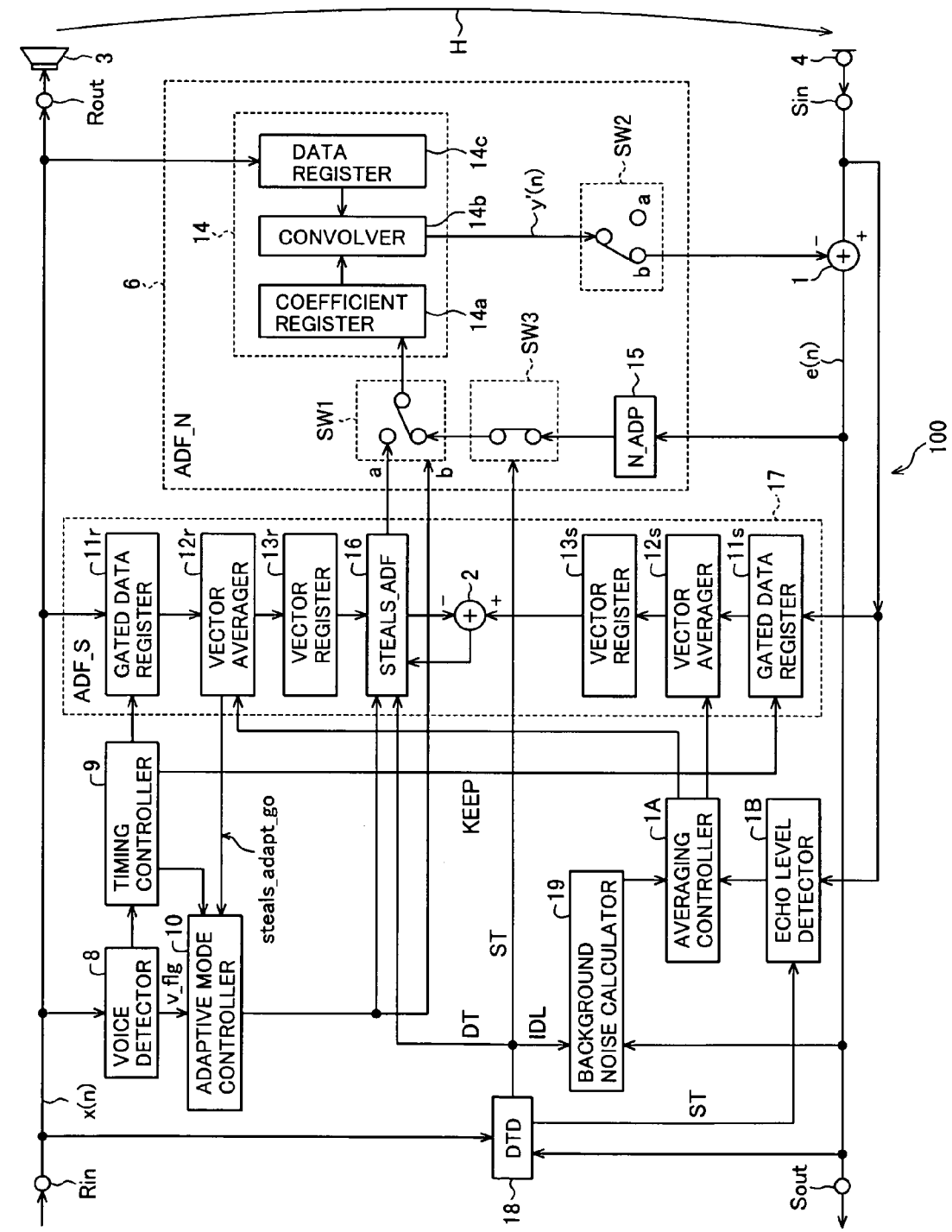
FIG. 1 is a block diagram illustrating the internal structure of an echo canceler according to a first embodiment of the invention.

Embodiments of the invention will now be described with reference to the attached drawings, in which like elements are indicated by like reference characters. The embodiments are echo cancelers employed in speakerphones, but it will be appreciated that the invention is not limited to use in speakerphones.

First Embodiment

Referring to the block diagram in FIG. 1, the echo canceler 100 in the first embodiment includes at least a receiving input terminal Rin, a receiving output terminal Rout, a sending input terminal Sin, a sending output terminal Sout, a normal adaptive filter section (ADF_N) 6, a silent adaptive filter section (ADF_S) 17, a voice detector 8, a timing controller 9, an adaptive mode controller 10, a double-talk detector (DTD) 18, a background noise calculator 19, a subtractor 1, shown as an adder with one negative input terminal, an averaging controller 1A, and an echo level detector 1B.

The normal adaptive filter section 6 comprises an echo replicator 14 having a coefficient register 14a, a convolver 14b, a data register 14c, a normal coefficient adapter (N_ADP) 15, and switches SW1 to SW3.

The silent adaptive filter section 17 comprises a pair of gated data registers 11r, 11s, which constitute a data selector; a pair of vector averagers 12r, 12s, which constitute a vector averager; a pair of vector registers 13r, 13s; an adaptation simulator (STEALS_ADF) 16; and a subtractor 2. The adaptation simulator 16 and subtractor 2 constitute an initial coefficient calculator.

Incidentally, STEALS stands for Silent Time Enhanced Adaptation Loading System.

A voice signal x(n) input by a far-end party (not shown) is routed via the receiving input terminal Rin of the speakerphone to the double-talk detector 18, the voice detector 8, the silent adaptive filter section 17, the normal adaptive filter section 6, and the receiving output terminal Rout. The notation x(n) indicates the nth sample of the voice signal x, where n is an arbitrary integer.

The voice signal x(n) output from the receiving output terminal Rout is converted to an analog signal by a digital-to-analog (D/A) converter (not shown) and the analog signal is output to a speaker 3, which produces audible sound.

A voice signal input from the speakerphone's microphone 4 by the near-end party (not shown) is converted to a digital signal by an analog-to-digital (A/D) converter (not shown) and the digital signal is routed through the sending input terminal Sin to subtractor 1, the silent adaptive filter section 17, and the echo level detector 1B.

The audible sound output from the speaker 3 is also picked up by the microphone 4 and routed to subtractor 1 through the sending input terminal Sin.

Subtractor 1 receives the input signal from the sending input terminal Sin and subtracts an echo replica signal y'(n), when switch SW2 is closed, to generate a residual signal e(n), which is supplied to the normal adapter 15, the double-talk detector 18, the background noise calculator 19, and the sending output terminal Sout.

The normal adapter 15 calculates a coefficient vector for use in the normal adaptive filter section 6 from the residual signal e(n) and far-end input signal data, and supplies the coefficient vector to the coefficient register 14a through switches SW3 and SW1.

In the initial state, switch SW3 is closed and the normal adapter 15 is connected to switch SW1. Afterward, switch SW3 is closed when switch SW3 receives a signal ST designating the single-talk state from the double-talk detector 18. In other states (the double-talk state, the silent state, and the near-talk state), switch SW3 is open.

In the initial state, switch SW1 is set so that its terminal_b, which is connected to switch SW3, is also connected to the coefficient register 14a. Switch SW1 supplies the coefficient register 14a with a coefficient vector from either the normal adapter 15 through switch SW3 or the silent adaptive filter section 17 according to a control signal from the adaptive mode controller 10.

The coefficient register 14a stores the coefficients used in the normal adaptive filter section 6 as a coefficient vector for generating the echo replica signal y'(n). The coefficient register 14a receives the coefficient vector from the normal adapter 15 through switches SW3 and SW1.

The convolver 14b convolves the coefficients stored in the data register 14c with the coefficients stored in the coefficient register 14a, by multiplying the coefficient values by the corresponding coefficient values and summing the results. The convolver 14b thereby generates the echo replica signal y'(n), and supplies the echo replica signal y'(n) to switch SW2

The data register 14c stores sample values of the input voice signal x(n).

In the initial state, switch SW2 is set so that its terminal_b, which is connected to subtractor 1, is also connected to the convolver 14b. Switch 2 supplies subtractor 1 either with the echo replica signal y'(n) output from the convolver 14b or with no signal, according to a control signal from the adaptive mode controller 10. For simplicity, the control signal line from the adaptive mode controller 10 to switch SW2 is omitted from the drawing.

The voice detector 8 detects the active state and silent state of the voice signal x(n) input by the far-end speaker from the receiving input terminal Rin, and sends a v_flg control signal indicating the active state or the silent state to the timing controller 9 and adaptive mode controller 10. The v_flg control signal is, for example, a bi-level signal with values of one (v_flg=1) designating the active state and zero (v_flg=0) designating the silent state.

The active and silent states can be detected in the voice detector 8 by taking the difference between a long-term average and a short-term average of the signal power.

Although the voice detector 8 differs from the double-talk detector 18 in this description, the double-talk detector 18 may include the voice detector 8.

From the v_flg control signal received from the voice detector 8, the timing controller 9 generates a KEEP signal which is supplied to the adaptive mode controller 10 and gated data registers 11r, 11s to control the collection of data samples of the near-end and far-end voice signals.

The adaptive mode controller 10 controls the operations of the adaptation simulator 16 in the silent adaptive filter section 17 and switch SW1 in the normal adaptive filter section 6 on the basis of the v_flg control signal received from the voice detector 8 and a steals_adapt_go control signal received from vector averager 12r.

When the v_flg control signal is asserted (v_flg=1) and the steals_adapt_go control signal is inactive (steals_adapt_go=0), under control of the adaptive mode controller 10, the adaptation simulator 16 in the silent adaptive filter section 17 halts operation.

When the v_flg control signal is asserted (v_flg=1), the adaptive mode controller 10 sets switches SW1 and SW2 so that in each case terminal_b is connected. When the v_flg control signal is inactive (v_flg=0), the adaptive mode controller 10 sets switches SW1 and SW2 so that terminal_a is connected.

From the voice signal x(n) received from the receiving input terminal Rin and the residual signal e(n) received from subtractor 1, the double-talk detector 18 detects the single-talk state, the double-talk state, the silent state, and the near-talk state and supplies signals indicating the detected state to the adaptation simulator 16, switch SW3, the background noise calculator 19, and the echo level detector 1B.

The state is detected by the double-talk detector 18 by applying a method disclosed, for example, by Ariyama in Japanese Patent Application Publication No. 2003-110469.

The four states detected by the double-talk detector 18 have the following meanings: in the single-talk state only the far-end party speaks; in the double-talk state the far-end and near-end parties speak simultaneously; in the silent state neither the far-end party nor the near-end party speaks; and in the near-talk state only the near-end party speaks.

The near-talk state may be regarded as a type of double-talk state in which the far-end input signal x(n) has comparatively low power and the near-end input signal y(n) from the sending input terminal Sin has comparatively high power. If this is done, the double-talk detector 18 only has to detect three states: the silent state, the double-talk state, and the single-talk state. The double-talk detector 18 in FIG. 1 outputs a signal ST to designate the single-talk state, a signal IDL to designate the silent state, and a signal DT to designate the double-talk and near-talk states.

If necessary, the double-talk detector 18 may output a separate signal (not shown) to designate the near-talk state.

When the background noise calculator 19 receives the IDL signal designating the silent state from the double-talk detector 18, it calculates an average power N_POW of the signal output from subtractor 1, representing ambient near-end noise, and supplies the average power N_POW to the averaging controller 1A. The interval over which the background noise calculator 19 averages the signal power is preferably matched to the short-term averaging interval used in the voice detector 8. A typical value is thirty milliseconds (30 ms), but the invention is not limited to this or any other particular interval.

When the echo level detector 1B receives the signal ST designating the single-talk state from the double-talk detector 18, it calculates an average power E_POW of the signal received at the sending input terminal Sin, which is an echo of the far-end signal, and supplies the average echo power E_POW to the averaging controller 1A. The interval over which the echo level detector 1B averages the signal power is also preferably matched to the short-term averaging interval used in the voice detector 8, e.g., 30 ms.

When the double-talk detector 18 outputs the signal ST, the far-end party is speaking and the near-end party is not speaking. Aside from ambient noise, accordingly, the microphone 4 therefore picks up only the far-and party's voice, as output from the speaker 3. This voice signal is routed toward the echo level detector 1B as an echo.

The averaging controller 1A receives the average ambient noise power N_POW from the background noise calculator 19 and the average echo power E_POW from the echo level detector 1B, and supplies a number AVEL_PILE_CNT to the vector averagers 12*r*, 12*s*.

The silent adaptive filter section 17 gathers near-end and far-end signal data and simulates the operation of the normal adaptive filter section 6 while the far-end signal is silent and the v_flg control signal is inactive (v_flg=0), thereby generating coefficient data adapted to the echo path. The generated coefficient data are supplied through switch SW1 to the echo replicator 14.

When the voice detector 8 detects a transition from the silent to the active state of the far-end input signal x(n), gated data register 11*r* collects and temporarily stores samples of the far-end signal x(n) and generates data vectors from the collected samples, and gated data register 11*s* collects and temporarily stores samples of the near-end signal y(n) and generates data vectors from the collected samples.

Vector averager 12*r* calculates an averaged vector from the data vectors generated by gated data register 11*r*. Vector averager 12*s* calculates an averaged vector from the data vectors generated by gated data register 11*s*. The number of vectors averaged in each case is AVEL_PILE_CNT.

Vector register 13*r* receives and stores the averaged vector generated in vector averager 12*r*. Vector register 13*s* receives and stores the averaged vector generated in vector averager 12*s*.

The adaptation simulator 16 convolves the averaged data vector stored in vector register 13*r* with an internally stored coefficient vector to generate a simulated echo replica signal. Subtractor 2 subtracts the simulated echo replica signal from the averaged vector stored in vector register 13*s* to generate a simulated residual signal, which is sent to the adaptation simulator 16. The adaptation simulator 16 updates the coefficient vector, and supplies the updated coefficient vector to the normal adaptive filter section 6.

Next, the operation of the echo canceler 100 in the first embodiment will be described.

Referring to FIG. 1, the voice signal x(n) received from the far-end party is routed via the receiving input terminal Rin of the speakerphone to the double-talk detector 18, the voice detector 8, the gated data register 11*r*, the data register 14*c*, and the receiving output terminal Rout. The digital signal output from the receiving output terminal Rout is converted to an analog signal, which is output from the speaker 3.

The voice of the near-end party is picked up by the speakerphone's microphone 4, which outputs an analog voice signal that is converted to a digital signal for input at the sending input terminal Sin, and supplied to subtractor 1. The sound output from the speaker 3 is also picked up by the microphone 4 and input as a digital signal at the sending input terminal Sin.

Subtractor 1 receives the near-end signal from the sending input terminal Sin and subtracts the echo replica signal y'(n), when switch SW2 is closed, to generate a residual signal e(n), which is supplied to the normal adapter 15, the double-talk detector 18, the background noise calculator 19, and the sending output terminal Sout.

First, the operation of the normal adaptive filter section 6 will be described.

In the initial state, switch SW1 in the normal adaptive filter section 6 is connected to terminal_b, switch SW2 is connected to terminal_b, and switch SW3 is closed.

The voice detector 8 detects the active state and silent state of the far-end input signal x(n) received at the receiving input terminal Rin, and sends a v_flg control signal indicating the active state or the silent state to the timing controller 9 and adaptive mode controller 10.

The active and silent states may be detected by taking the difference between a long-term average and a short-term average of the signal power. For example, if LPO_L is the long-term average power calculated over an interval of five seconds and LPO_S is the short-term average power calculated over an interval of 30 ms, the active state may be detected when the following condition is satisfied, where VD_$\delta$ is a predetermined detection margin such as six decibels (6 dB).

$$LPO\_S > LPO\_L + VD\_\delta \quad (1)$$

When this condition is not satisfied, the silent state is detected.

The v_flg control signal is a bi-level signal with values of one (v_flg=1) designating the active state and zero (v_flg=0) designating the silent state.

When the v_flg control signal from the voice detector 8 is asserted (v_flg=1) and the steals_adapt_go control signal from the vector averager 12*r* is inactive (steals_adapt_go=0), under control of the adaptive mode controller 10, the adaptation simulator 16 halts operation. When the v_flg control signal is asserted, the adaptive mode controller 10 connects switches SW1 and SW2 to terminal_b.

When the v_flg control signal is inactive (v_flg=0), the adaptive mode controller 10 connects switches SW1 and SW2 to terminal_a.

The double-talk detector 18 closes switch SW3 in the single-talk state, and opens switch SW3 in other states. In the single-talk state, the voice detector 8 detects the active state and asserts the v_flg control signal (v_flg=1).

Accordingly, even if the v_flg control signal from the voice detector 8 is asserted (v_flg=1), since switch SW3 is open in the double-talk state, switch SW1 does not receive the output from the normal adapter 15 and the echo replicator 14 halts the updating of coefficients.

From the v_flg control signal received from the voice detector 8, the timing controller 9 generates the KEEP signal supplied to the adaptive mode controller 10 and the gated data registers 11*r*, 11*s* to control the collection of samples of the near-end and far-end signals. The timing controller 9 asserts the KEEP signal for a certain period starting each time the v_flg control signal changes from zero to one (each transition from v_flg=0 to v_flg=1).

In the operation of the normal adaptive filter section 6 as described above, when the v_flg control signal is asserted (v_flg=1), the silent adaptive filter section 17 has no effect on the normal adaptive filter section 6 and its related components, including the voice detector 8, the adaptive mode controller 10, the receiving input terminal Rin, the receiving output terminal Rout, the sending input terminal Sin, the sending output terminal Sout, the speaker 3, and the microphone 4.

Switch 3 is closed when switch SW3 receives the signal ST designating the single-talk state from the double-talk detector 18. In other states (more specifically, the double-talk state, the silent state, and the near-talk state), switch SW3 is open.

When the background noise calculator 19 receives the IDL signal designating the silent state from the double-talk detector 18, it calculates an average power N_POW of the outgoing signal, which represents ambient near-end noise, and supplies the average power N_POW to the averaging controller 1A. The interval over which the background noise calculator 19 averages the signal power is preferably matched to the short-term averaging interval used in the voice detector 8. A typical value is 30 ms, but the invention is not limited to this or any other particular interval.

When the echo level detector 1B receives the signal ST designating the single-talk state from the double-talk detector 18, it calculates the average power E_POW of the signal received at the sending input terminal Sin. In the single-talk state, since the near-end party is not talking, the signal received at the sending input terminal Sin is mainly an echo of the far-end signal, so E_POW is an average echo power. The average echo power E_POW is supplied to the averaging controller 1A. The interval over which the echo level detector 1B averages the signal power is also preferably matched to the short-term averaging interval used in the voice detector 8, e.g., 30 ms.

The averaging controller 1A receives the average echo power E_POW and the average ambient noise power N_POW, and supplies a number AVEL_PILE_CNT to the vector averagers 12r, 12s.

When the v_flg control signal is asserted (v_flg=1), the adaptive mode controller 10 sets switches SW1 and SW2 so that terminal_b is connected; then in the single-talk state, when the double-talk detector 18 closes switch SW3, the normal adaptive filter section 6 operates as described below.

First, N consecutive samples of the far-end input signal x(n) received at the receiving input terminal Rin are stored in data register 14c. The stored samples may be treated as a data vector X(n) expressed by the following equation (2).

$$X(n)=[x(n), x(n-1), \ldots, x(n-N+1)]^t \quad (2)$$

The letter n is the sample number, N is the tap length (e.g., 1024 in the first embodiment), and the superscript t denotes transposition.

Accordingly, X(n) is a column vector of the N most recently received far-end signal samples up to and including time n.

X(n) will also be denoted Xn where convenient below. Similarly, near-end data vectors will be denoted interchangeably as Y(n) and Yn.

The coefficient register 14a stores N tap coefficients. The normal adapter 15 constantly updates the N coefficient values. The N tap coefficients stored in the coefficient register 14a may be treated as a coefficient vector H(n) expressed by the following equation (3).

$$H(n)=[h(0), h(1), \ldots, h(N-1)]^t \quad (3)$$

Convolver 14b receives the coefficient vector H(n) stored in the coefficient register 14a and the data vector X(n) stored in data register 14c, and calculates the single-valued scalar product y'(n) of the coefficient vector H(n) and the data vector X(n) expressed by the following equation (4). The scalar product y'(n) is the echo replica signal y'(n), which is sent to switch SW2.

$$y'(n)=H^t(n)X(n) \quad (4)$$

Since switch SW2 is connected to terminal_b under control of the adaptive mode controller 10, subtractor 1 receives the echo replica signal y'(n).

Subtractor 1 subtracts the echo replica signal y'(n) from the echo y(n) picked up by the microphone 4 to generate the residual signal e(n), expressed by the following equation (5), which is sent to the sending output terminal Sout, the double-talk detector 18, and the background noise calculator 19.

$$e(n)=y(n)-y'(n) \quad (5)$$

From the sending output terminal Sout, the residual signal e(n) is transmitted to the far-end party (not shown).

Subtractor 1 also sends the residual signal e(n) to the normal adapter 15. The normal adapter 15 uses the NLMS algorithm expressed by the following equation (6), for example, to calculate new tap coefficients for use in the normal adaptive filter section 6, and updates the coefficient values. X(n) in equation (6) is the same data vector as stored in data register 14c.

$$H(n+1) = H(n) + \alpha \frac{x(n)e(n)}{\sum_{i=0}^{N-1} x^2(n-i)} \quad (6)$$

The normal adapter 15 sends the updated coefficient vector H(n+1) to the coefficient register 14a via switches SW3 and SW1 for use in generating the next echo replica signal y'(n+1).

Over repeated updates, normally the absolute value of the residual signal e(n) in equation (5) gradually diminishes to the point where the update computation in equation (6) leaves the coefficient vector substantially unchanged. This state is described by saying that the normal adaptive filter section 6 has converged.

The normal adaptive filter section 6 can then accurately cancel the echo y(n), and continues to do so as long as the v_flg control signal from the voice detector 8 remains active (v_flg=1) and the double-talk detector 18 detects the single-talk state.

The silent adaptive filter section 17 gathers near-end and far-end signal data and simulates the operation of the normal adaptive filter section 6 while the far-end signal is silent, the v_flg control signal is inactive (v_flg=0), and the normal adaptive filter section 6 is halted, thereby generating coefficient data adapted to the echo path H. The generated coefficient data are supplied through switch SW1 to the echo replicator 14.

When the voice detector 8 detects a transition from the silent to the active state of the far-end input signal x(n), the voice detector 8 asserts the v_flg control signal (v_flg=1), which is supplied to the timing controller 9.

The timing controller 9 asserts the KEEP signal for a predetermined period. At an inactive-to-active transition of the v_flg control signal (a transition from v_flg=0 to v_flg=1), the timing controller 9 starts counting at the sampling rate and asserts the KEEP signal until the sample count reaches a predetermined value denoted LENGTH, regardless of further changes of the far-end input signal between the active and silent states.

While the KEEP signal is active, gated data register 11r collects and temporarily stores samples of the far-end signal x(n), and gated data register 11s collects and temporarily stores samples of the near-end signal y(n).

These samples may include both active-state data and silent-state data. The gated data register 11r and the gated data register 11s operate regardless of the state detected by the double-talk detector 18.

In the first embodiment, a typical value of the LENGTH parameter is 38,400 samples, but the invention is not limited to this or any other particular number.

Figure 2:
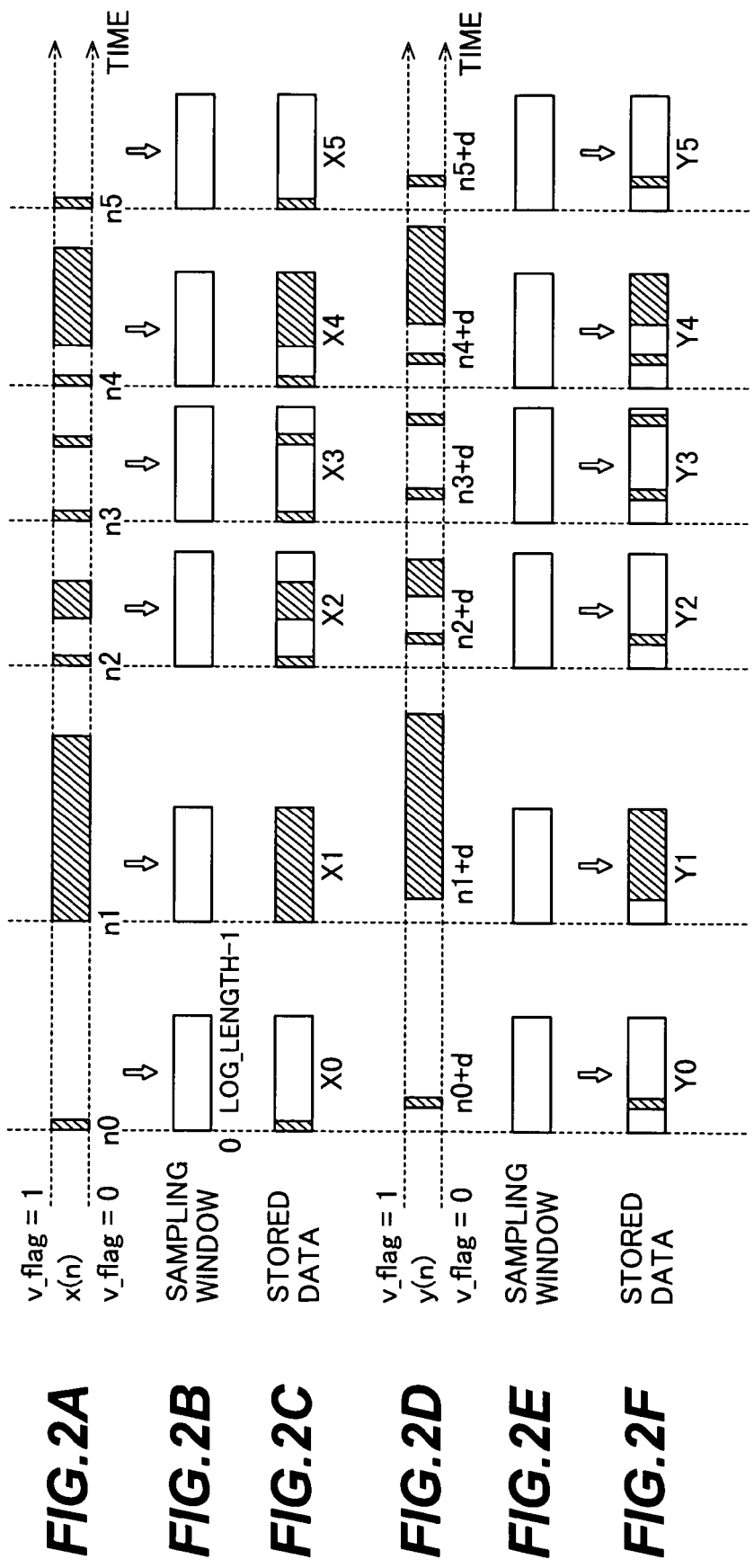
FIGS. 2A to 2F are timing diagrams illustrating the operation of the gated data registers in the first embodiment.

FIG. 2A schematically illustrates exemplary intervals in which the far-end input signal x(n) is active (the hatched intervals) and silent. The voice detector 8 asserts the v_flg control signal (v_flg=1) during the hatched intervals.

FIG. 2B shows the corresponding sampling windows, that is, the intervals during which the timing controller 9 asserts the KEEP signal and samples of the far-end signal are collected. Once a sampling window opens at the timing of a transition from v_flg=0 to v_flg=1, the window remains open for the predetermined period (LENGTH), regardless of further transitions of the v_flg control signal.

FIG. 2C schematically illustrates six exemplary data vectors X0 to X5 expressed by the following equation (7), which are generated from the collected samples of the far-end signal under control of the timing controller 9.

$$\begin{aligned}
X0 &= [x(n0), \ldots, x(n0 + \text{LENGTH} - 1)] \\
X1 &= [x(n1), \ldots, x(n1 + \text{LENGTH} - 1)] \\
X2 &= [x(n2), \ldots, x(n2 + \text{LENGTH} - 1)] \\
X3 &= [x(n3), \ldots, x(n3 + \text{LENGTH} - 1)] \\
X4 &= [x(n4), \ldots, x(n4 + \text{LENGTH} - 1)] \\
X5 &= [x(n5), \ldots, x(n5 + \text{LENGTH} - 1)]
\end{aligned} \quad (7)$$

In FIGS. 2A and 2C, for simplicity, the far-end input signal X(n) is shown as having a constant fixed amplitude during the hatched intervals. Six is the maximum number of data vectors that can be stored at once in this embodiment, although the invention is not limited to this particular number. As described below, the number of data vectors actually used varies according to the echo power and ambient noise power.

During these sampling windows, while the timing controller 9 asserts the KEEP signal, gated data register 11s also collects and stores samples y(n) of the near-end signal received from the sending input terminal Sin.

Accordingly, this sampling also starts at timings controlled by the v_flg control signal output by the voice detector 8 on the basis of activity at the receiving input terminal Rin.

As noted above, the echo y(n) includes a delay (d) representing the temporal length of the echo path.

FIG. 2D schematically illustrates exemplary intervals in which the echo y(n) is active (the hatched intervals) and silent. FIG. 2E shows the corresponding sampling windows, during which gated data register 11s collects samples y(n) of the echo of the far-end input signal in FIG. 2A, delayed by the echo path and picked up by the microphone 4, and generates the data vectors Y0 to Y5 shown in FIG. 2F. The sampling windows in FIG. 2E are the intervals during which the timing controller 9 asserts the KEEP signal, and are identical to the sampling windows in FIG. 2B. The data vectors can be expressed by the following equation (8).

$$\begin{aligned}
Y0 &= [y(n0), \ldots, y(n0 + \text{LENGTH} - 1)] \\
Y1 &= [y(n1), \ldots, y(n1 + \text{LENGTH} - 1)] \\
Y2 &= [y(n2), \ldots, y(n2 + \text{LENGTH} - 1)] \\
Y3 &= [y(n3), \ldots, y(n3 + \text{LENGTH} - 1)] \\
Y4 &= [y(n4), \ldots, y(n4 + \text{LENGTH} - 1)] \\
Y5 &= [y(n5), \ldots, y(n5 + \text{LENGTH} - 1)]
\end{aligned} \quad (8)$$

As the gated data registers 11r, 11s continue to collect samples and store data vectors, when the predetermined maximum number of data vectors have been stored, further data vectors are cyclically overwritten onto the stored data vectors.

In the first embodiment, for example, since the predetermined maximum number of data vectors is six, when data vectors X(5) and Y(5), also denoted X5 and Y5, have been stored, the next pair of data vectors expressed by equation (8-1) below are overwritten on the first pair of data vectors expressed by equation (8-2) below and storage proceeds thereafter as in a ring buffer.

$$X6 = [x(n6), \ldots, x(n6 + \text{LENGTH} - 1)]$$

$$Y6 = [y(n6), \ldots, y(n6 + \text{LENGTH} - 1)] \quad (8\text{-}1)$$

$$X0 = [x(n0), \ldots, x(n0 + \text{LENGTH} - 1)]$$

$$Y0 = [y(n0), \ldots, y(n0 + \text{LENGTH} - 1)] \quad (8\text{-}2)$$

Vector averager 12r receives data vectors X(n) from gated data register 11r and vector averager 12s receives data vectors Y(n) from gated data register 11s. Each time a new data vector has been assembled, the gated data registers 11r, 11s send respective timing signals (keep_flag_on_to_off=1) to the vector averagers 12r, 12s. At other times, the timing signals are left in the inactive state (keep_flag_on_to_off=0).

The vector averagers 12r, 12s calculate the average of the AVEL_PILE_CNT most recently received data vectors.

The number AVEL_PILE_CNT must be equal to or less than the maximum number FULL_PILE (AVEL_PILE_CNT≦FULL_PILE). FULL_PILE is predetermined in consideration of memory capacity and is six in the first embodiment (FULL_PILE=6).

Since gated data registers 11r and 11s output the keep_flag_on_to_off timing signal at identical timings, one of gated data register 11r and gated data register 11s (for example, gated data register 11r) may supply the keep_flag_on_to_off timing signal to both vector averagers 12r and 12s.

Initially, before the number of the stored data vectors has reached the predetermined number AVEL_PILE_CNT, the vector averagers 12r, 12s average the number (denoted pile_cnt) of data vectors actually stored.

In the first embodiment (AVEL_PILE_CNT≦FULL_PILE=6), once AVEL_PILE_CNT data vectors X(n) and Y(n) have been stored, the vector averagers 12r, 12s calculate moving averages of AVEL_PILE_CNT data vectors, but before that time, they calculate running averages of the number pile_cnt of data vectors actually stored.

Since the operation of vector averager 12s differs from the operation of vector averager 12r only in that it receives data vectors Y(n) representing the echo instead of data vectors X(n) representing the far-end input signal, the averaging calculation performed by vector averagers 12s and 12r will be described together below, to make a description simple.

Vector averagers 12s and 12r calculate averages of pile_cnt (pile_cnt=1 to AVEL_PILE_CNT) data vectors, and eventually obtain the averages of the predetermined number AVEL_PILE_CNT of data vectors as expressed by equations (9) and (10) below. The number AVEL_PILE_CNT does not exceed the maximum number FULL_PILE (AVEL_PILE_CNT≦FULL_PILE=6).

When the first data vector X(0) expressed by the following equation (8-3), denoted X0 below for simplicity, is stored, pile_cnt is initialized to one (pile_cnt=1). As successive data vectors Xn are stored, pile_cnt is incremented one by one until six is reached (pile_cnt=6=FULL_PILE), as follows.

$$X0=[x(n0), \ldots, x(n0+\text{LENGTH}-1)] \rightarrow \text{pile\_cnt}=1$$

$$X1=[x(n1), \ldots, x(n1+\text{LENGTH}-1)] \rightarrow \text{pile\_cnt}=2$$

$$X2=[x(n2), \ldots, x(n2+\text{LENGTH}-1)] \rightarrow \text{pile\_cnt}=3$$

$$X3=[x(n3), \ldots, x(n3+\text{LENGTH}-1)] \rightarrow \text{pile\_cnt}=4$$

$$X4=[x(n4), \ldots, x(n4+\text{LENGTH}-1)] \rightarrow \text{pile\_cnt}=5$$

$$X5=[x(n5), \ldots, x(n5+\text{LENGTH}-1)] \rightarrow \text{pile\_cnt}=6=\text{FULL\_PILE} \quad (8\text{-}3)$$

When the timing signal is asserted (keep_flag_on_to_off=1), the vector averagers 12*r*, 12*s* average the data vectors actually stored to generate input vectors steals_rin and steals_sin as simulated far-end and near-end input signals.

Vector averager 12*r* generates the data vector expressed by the following equation (8-4) by averaging the Xn vectors.

$$\text{steals\_rin}=[\text{rin\_keep}[0], \ldots, \text{rin\_keep}(\text{LENGTH}-1)] \quad (8\text{-}4)$$

Vector averager 12*s* generates the data vector expressed by the following equation (8-5) by averaging the Yn data vectors.

$$\text{steals\_sin}=[\text{sin\_keep}[0], \ldots, \text{sin\_keep}[\text{LENGTH}-1]] \quad (8\text{-}5)$$

The elements rin_keep[k] and sin_keep[k] are expressed by the following equations (9) and (10).

$$\text{rin\_keep}[k] = \frac{\sum_{i=0}^{AVEL\_FILE\_CNT-1} x(ni+k)}{AVEL\_PILE\_CNT} \quad (9)$$

$$\text{sin\_keep}[k] = \frac{\sum_{i=0}^{AVEL\_FILE\_CNT-1} y(ni)}{AVEL\_PILE\_CNT} \quad (10)$$

Figure 3:
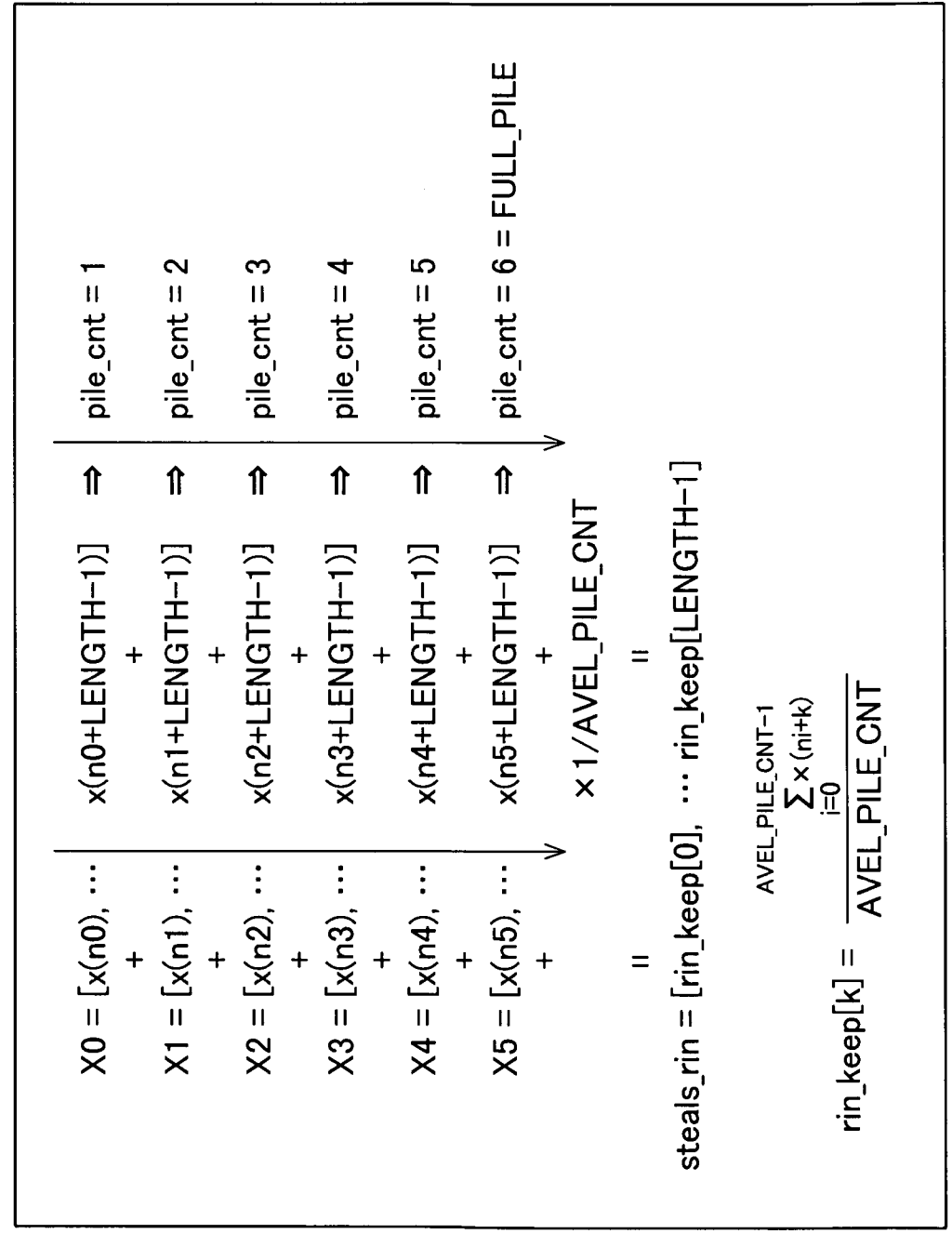
FIG. 3 illustrates the averaging calculation performed in the vector averagers in the first embodiment.

The averaging process is summarized in FIG. 3. Successive averaging calculations proceed in the direction of the arrows.

The operation of the averaging controller 1A in the averaging process will now be described.

The averaging controller 1A determines the number AVEL_PILE_CNT according to the ratio E/N between the average power N_POW of the ambient noise obtained from the background noise calculator 19 and the average power E_POW of the echo obtained from the echo level detector 1B. The number AVEL_PILE_CNT takes values from one to the maximum number FULL_PILE (AVEL_PILE_CNT=1 to 6) and is identical to one of the numbers pile_cnt expressed in equation (8-3).

The appropriate value of AVEL_PILE_CNT is determined from the echo-to-noise ratio E/N as, for example, in Table 1 below. In the first embodiment, once the value of AVEL_PILE_CNT has been determined from the E/N ratio at the beginning of a telephone conversation, AVEL_PILE_CNT remains constant until the telephone conversation ends. In a variation of the first embodiment, AVEL_PILE_CNT may vary from one to FULL_PILE according to changes in the E/N ratio during the telephone conversation.

TABLE 1

Ratio E/N and corresponding values of AVEL_PILE_CNT

| E/N = $\log_{10}$(E_POW/N_POW) (decibels) | Value of AVEL_PILE_CNT |
|---|---|
| 0 ≦ E/N < 6 | 6 (FULL_PILE) |
| 6 ≦ E/N < 12 | 4 |
| 12 ≦ E/N < 18 | 2 |
| 18 ≦ E/N < 24 | 1 |
| 24 ≦ E/N | 1 |

Figure 4:
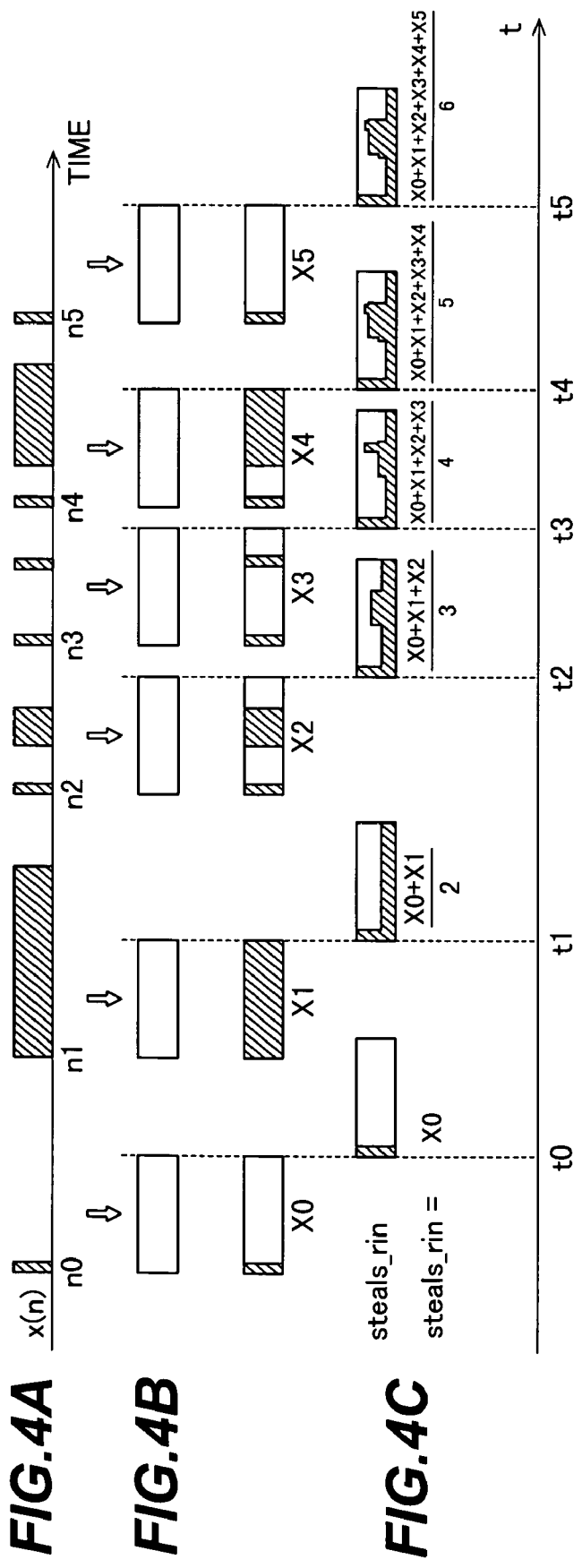
FIGS. 4A to 4C are timing diagrams illustrating the averaging of the simulated far-end input signals in the first embodiment.

FIGS. 4A to 4C further illustrate the averaging process when the number AVEL_PILE_CNT is six (FULL_PILE) on condition that the ratio of echo power to background noise power is three decibels (E/N=3 dB) as shown in Table 1.

FIGS. 4A and 4B are identical to FIGS. 2A to 2C: the far-end input signal x(n) is shown in FIG. 4A, the sampling windows in upper part in FIG. 4B, and the data vectors X0 to X5 in lower part in FIG. 4B.

At time t0, gated data register 11*r* has stored only one data vector X0 of the samples x(n). Accordingly, vector averager 12*r* outputs data vector X0 as the first averaged vector steals_rin as shown in FIG. 4C and expressed by the following equation (11).

$$\text{steals\_rin}=X0 \quad (11)$$

At time t1, when data vectors X0 and X1 are stored, a second averaged vector steals_rin expressed by the following equation (12) is generated as indicated by the hatching in FIG. 4C.

$$\text{steals\_rin}=(X0+X1)/\text{AVEL\_PILE\_CNT (or pile\_cnt)} \quad (12)$$

In FIG. 4C, the number AVEL_PILE_CNT is set to six (AVEL_PILE_CNT=6), so at times t0 to t4, when six data vectors have not yet been stored, the vector averager 12*r* averages the number pile_cnt of data vectors actually stored.

At times t2 to t5, vector averager 12*r* receives further data vectors and calculates new averaged vectors steals_rin.

In the first embodiment, in order to reduce the quantity of data involved in the averaging operations, a predetermined time margin δAV may be provided before the averaged vector steals_rin is input to the silent adaptive filter section 17. For a 16-kHz sampling rate, a preferred margin δAV is 10 ms (160 samples). For simplicity, the margin δAV will not be considered below.

After time t5, each time a new data vector Xn is received, a new averaged vector steals_rin is calculated from the AVEL_PILE_CNT most recently received data vectors. FIG. 4C illustrates the case in which AVEL_PILE_CNT is set at the predetermined maximum number FULL_PILE (FULL_PILE=6).

Similarly, vector averager 12*s* generates averaged vectors steals_sin from data vectors Yn of samples of the echo and outputs these averaged vectors at the same timing.

Vector register 13*r* receives and stores the averaged vectors steals_rin generated in vector averager 12*r*. Vector register 13*s* receives and stores the averaged vectors steals_sin generated in vector averager 12*s*.

Each time the averaging process is completed, vector averager 12*r* asserts the steals_adapt_go control signal (steals_adapt_go=1), indicating to the adaptive mode controller 10 that preparations for updating the tap coefficients in the silent state are complete.

The adaptive mode controller 10 controls the adaptation mode according to the steals_adapt_go control signal and the v_flg control signal received from the voice detector 8.

TABLE 2

States of control signals when normal and silent adaptive operations are performed

| v_flg | steals_adapt_go | ADF_N | ADF_S |
|---|---|---|---|
| 0 | 0 | no operation | no operation |
| 1 | 0 | adaptation operations | no adaptation operation |
| 0 | 1 | no adaptation operation | adaptation operations |
| 1 | 1 | adaptation operations | no adaptation operation, steals_adapt_go is reset to zero (steals_adapt_go = 0) |

Referring to Table 2, when the steals_adapt_go control signal from vector averager 12r or the v_flg control signal from the voice detector 8 is asserted, either the normal adaptive filter section 6 or the silent adaptive filter section 17 carries out adaptation operations under control of the adaptive mode controller 10. The normal adaptive filter section 6 and the silent adaptive filter section 17 do not both carry out adaptation operations simultaneously.

The normal adaptive filter section 6 carries out adaptation operations only when the voice detector 8 detects the active state (v_flg=1) as shown in Table 2.

The silent adaptive filter section 17 carries out adaptation operations only when the voice detector 8 detects the silent state (v_flg=0) and the steals_adapt_go control signal is active (steals_adapt_go=1), with further restrictions described later.

As noted above, steals_adapt_go becomes active at the completion of an averaging calculation.

Figure 5:
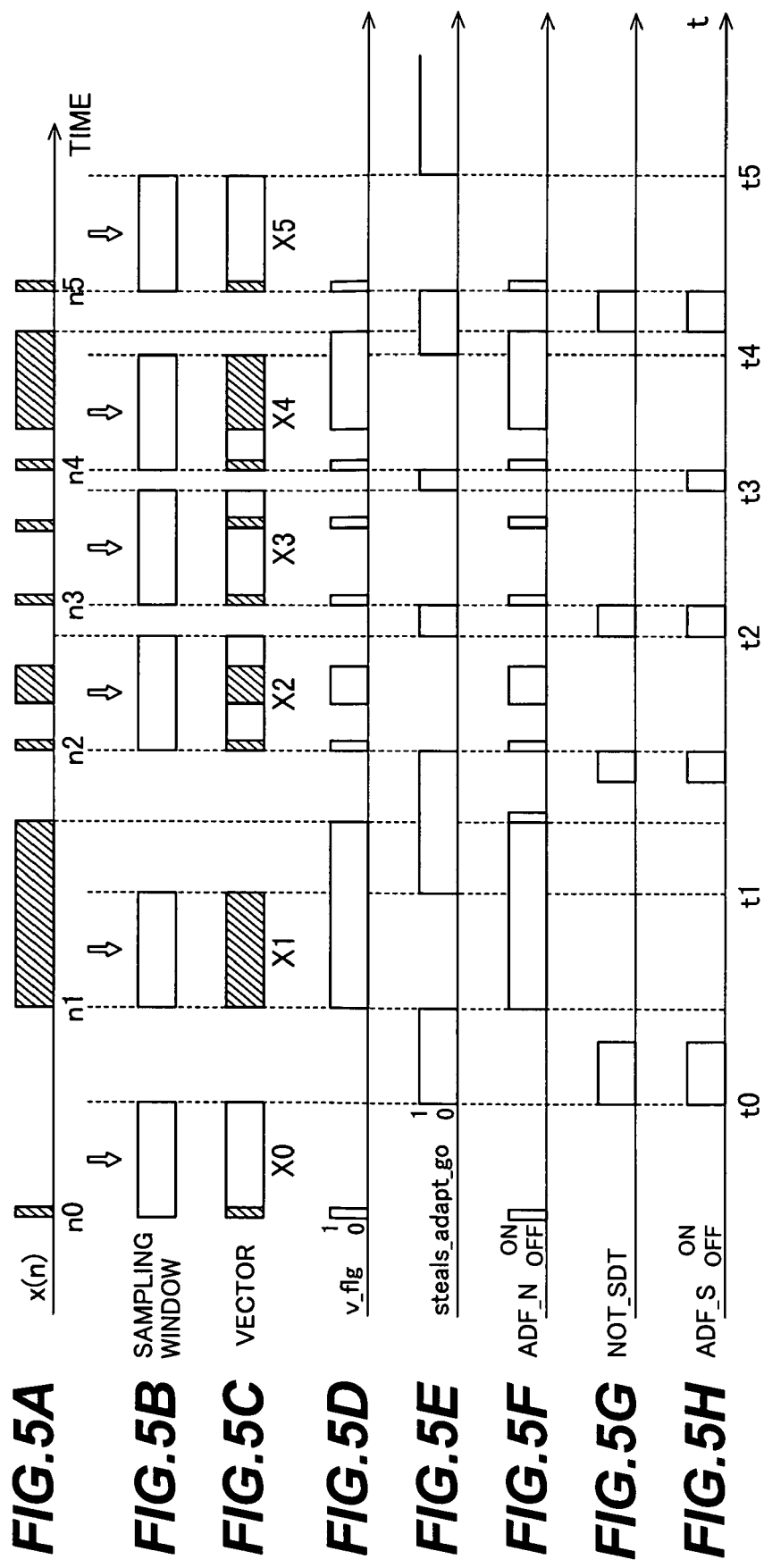
FIGS. 5A to 5H are timing diagrams illustrating various states during the averaging process in the first embodiment.

FIGS. 5A to 5H further illustrate the averaging process. The far-end input signal x(n) is shown in FIG. 5A, the sampling windows are shown in FIG. 5B, and the data vectors X0 to X5 are shown in FIG. 5C; since FIGS. 5A to 5C are identical to FIGS. 4A and 4B, descriptions will be omitted.

As shown in FIG. 5D, the v_flg control signal is asserted (v_flg=1) when the voice detector 8 detects the active state and is reset (v_flg=0) when the voice detector 8 detects the silent state.

As shown in FIG. 5E, the steals_adapt_go control signal is asserted (steals_adapt_go=1) at the end of a sampling window, when one pair of vectors steals_rin and steals_sin is ready for input, and is reset (steals_adapt_go=0) at the beginning of the next sampling window, when the collection of data for the next pair of vectors begins.

FIG. 5F indicates when the normal adaptive filter section 6 carries out adaptation operations (ADF_N=ON) and does not carry out adaptation operations (ADF_N=OFF). The normal adaptive filter section 6 is controlled by switch control signals supplied from the adaptive mode controller 10 and double-talk detector 18.

FIG. 5G illustrates the values of a NOT_SDT vector which enables use of the data in the averaged data vectors, as described later.

FIG. 5H indicates when the silent adaptive filter section 17 carries out adaptation operations (ADF_S=ON) and does not carry out adaptation operations (ADF_S=OFF). The silent adaptive filter section 17 carries out adaptation operations only when the voice detector 8 detects the silent state (v_flg=0), the steals_adapt_go control signal is active (steals_adapt_go=1), and the NOT_SDT vector indicates that usable averaged data are available.

In particular, the silent adaptive filter section 17 does not carry out adaptation operations while the received far-end signal is active (v_flg=1); the silent adaptive filter section 17 operates only while the received far-end signal is silent.

As noted above, the averaged vector steals_sin=[sin_keep[0], ..., sin_keep(LENGTH−1)] is generated and sent to vector register 13s at the same timing as the timing at which the averaged vector steals_rin=[rin_keep[0], ..., rin_keep(LENGTH−1)] is generated and sent to vector register 13r. The silent adaptive filter section 17 uses the data stored in the vector registers 13r, 13s to update the tap coefficients it is preparing for the normal adaptive filter section 6.

Figure 6:
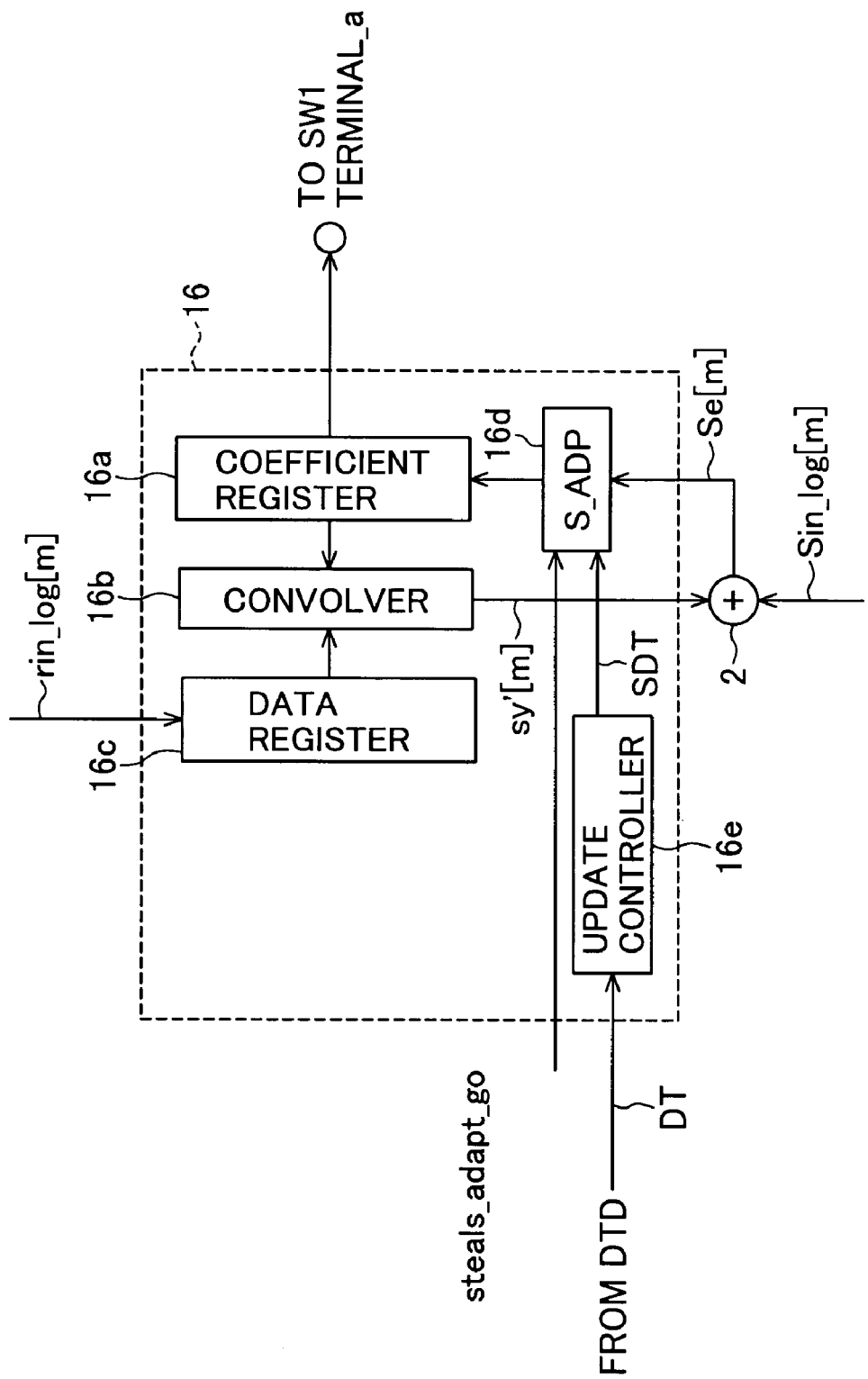
FIG. 6 is a block diagram illustrating the internal structure of the silent adapter in the first embodiment.

Referring to FIG. 6, the adaptation simulator 16 in the silent adaptive filter section 17 includes at least a coefficient register 16a, a convolver 16b, a data register 16c, a silent adapter 16d, and an update controller 16e. The adaptation simulator 16 differs from the echo replicator 14 by including the silent adapter 16d and update controller 16e.

Data register 16c receives the elements rin_keep[k] one by one from vector register 13r. The initial values in data register 16c are all zero. In the first embodiment, data register 16c is reset to all zeros at each 0-to-1 transition of the steals_adapt_go control signal from the vector averager 12r via the adaptive mode controller 10.

Coefficient register 16a stores N tap coefficients, the same as the number of tap coefficients stored in coefficient register 14a in the normal adaptive filter section 6. The tap coefficients stored in coefficient register 16a can be represented by a vector W(m) expressed by the following equation (13).

$$W(m)=[W(0), W(1), \ldots, W(N-1)]^t \quad (13)$$

The letter m indicates the sample number and the superscript t denotes transposition.

Coefficient register 16a resets W(m) to the zero vector at the start of operation and continues to update the coefficients thereafter without resetting W(m) again.

The elements of the averaged vector steals_rin, from rin_keep[0] to rin_keep(LENGTH−1), are shifted one by one into data register 16c.

Data register 16c stores N of these elements as a simulated far-end data vector Sx(m) expressed by the following equation (14).

$$Sx(m)=[Sx(m), Sx(m-1), \ldots, Sx(m-N+1)]^t \quad (14)$$

When the sample number is equal to zero (m=0), since data register 16c has received only a single element rin_keep[0], the stored sample vector Sx(0) is expressed by the following equation (15).

$$Sx(0)=[rin\_keep[0], 0, \ldots, 0]^t \quad (15)$$

Convolver 16b convolves the data vector Sx(m) in equation (14) with the vector W(m) in equation (13), by multiplying the data values by the corresponding coefficient values and summing the results, generates a simulated echo replica signal Sy'(m) internal to the silent adaptive filter section 17, and sends it to subtractor 2. The simulated echo replica signal Sy'(m) is expressed by the following equation (16).

$$Sy'(m)=W(m)Sx(m) \quad (16)$$

Subtractor 2 receives the element sin_keep[m] of the averaged vector steals_sin from vector register 13s at the same timing as the timing at which vector register 13r supplies the element rin_keep[m] of the averaged vector steals_rin, and subtracts the simulated echo replica signal Sy'(m) to generate a simulated residual signal Se(m), which is sent to the silent adapter 16*d*.

The silent adapter 16*d* receives a vector SDT from the update controller 16*e* and halts the updating of the tap coefficients in the silent adaptive filter section 17 at appropriate times, or restricts the data used.

The update controller 16*e* generates the vector SDT as a set of flags that are used to exclude data collected in the double-talk state, as detected by the double-talk detector 18, from the adaptation process, as described below. The collected data are the data that were averaged by the vector averager 12*r* and vector averager 12*s* to generate the data vectors in the following equation (17).

$$\text{steals\_rin} = [\text{rin\_keep}[0], \ldots, \text{rin\_keep}(\text{LENGTH}-1)]$$

$$\text{steals\_sin} = [\text{sin\_keep}[0], \ldots, \text{sin\_keep}(\text{LENGTH}-1)] \quad (17)$$

If the dth sample in even one of the data vectors averaged to obtain the vectors in equation (17) was collected during the double-talk state as detected by the double-talk detector 18, the corresponding flag or element SDT[d] of the vector SDT is set to '1'. If, for example, the 0th to 159th samples in the first collected data vector X0 (collected when pile_cnt=1) and the 160th to 319th samples in the second data vector X1 (collected when pile_cnt=2) were collected in the double-talk state, the vector SDT output for the second averaged vectors has the form indicated in the following equation (18).

$$SDT = [sDT[0], \ldots, sDT[319], sDT[320], \ldots,$$

$$sDT[\text{LENGTH}-1]$$

$$= [1, \ldots, 1, 0, \ldots, 0] \quad (18)$$

The update controller 16*e* takes the logical NOT of the vector SDT by inverting '1' and '0' to generate the vector NOT_SDT.

$$\text{NOT\_SDT} = [\text{NOT\_SDT}[0], \ldots, \text{NOT\_SDT}[319], \quad (19)$$

$$\text{NOT\_SDT}[320], \ldots, \text{NOT\_SDT}[\text{LENGTH}-1]$$

$$= [0, \ldots, 0, 1, \ldots, 1]$$

The silent adapter 16*d* updates the coefficient vector W(m) to a vector W(m+1), using the averaged vector data for which the corresponding NOT_SDT flag is set to '1'. Elements of the averaged data vectors that correspond to elements of the SDT vector that are set to '1' are not used. In the example above, the following elements of the averaged data vectors are not used.

$$\text{steals\_rin} = [\text{rin\_keep}[0], \ldots, \text{rin\_keep}[319]]$$

$$\text{steals\_sin} = [\text{sin\_keep}[0], \ldots, \text{sin\_keep}[319]] \quad (20)$$

The coefficient updating operation is described by the following equation (21). The data in the above equation (20) are not used, i.e., these data are excluded from the calculations or, if no data are left available, for example, the calculations are not performed for some or all of the coefficients in the coefficient vector W(m).

$$W(m+1) = W(m) + \alpha \frac{Sx(m)Se(m)}{\sum_{i=0}^{N-1} Sx^2(m-i)} \quad (21)$$

The updated coefficient vector W(m) is sent to switch SW1 (FIG. 1). Because the v_flg control signal is inactive, switch SW1 is connected to terminal_a, so the updated coefficient vector W(m) is overwritten on the coefficient vector H(m) stored in the normal adaptive filter section 6, as expressed by the following equation (22).

$$H(m) = W(m) \quad (22)$$

When the active state is next detected and the normal adaptive filter section 6 is restarted, the most recent values of coefficient vector W(m) are used as the initial values of coefficient vector H(m). When the far-end input signal is active, the normal adaptive filter section 6 adapts, converges, and reduces the echo component. Simultaneously, the silent adaptive filter section 17 stores data vectors including samples of the far-end and near-end input signals and prepares to continue the adaptation process in the silent state.

In the silent state, while the normal adaptive filter section 6 is halted, the silent adaptive filter section 17 simulates the adaptation process in the normal adaptive filter section 6, using simulated input signals obtained by averaging the stored data vectors, to generate tap coefficients that continue to converge. When the active state resumes, these tap coefficients provide a starting point from which the normal adaptive filter section 6 can adapt and converge quickly.

As explained above, however, samples collected in the double-talk state are not used for updating the tap coefficients in the silent adaptive filter section 17.

The echo canceler 100 in the first embodiment averages a larger or smaller number of data vectors Xn, Yn depending on the presence or absence of ambient noise. In the absence of ambient noise, the echo canceler 100 averages a relatively small number of data vectors, which reduces the computational load on the vector averagers 12*r*, 12*s*, thereby reducing power consumption, and also enables the coefficients to converge more quickly, resulting in reduced residual echo. In the extreme case (when AVEL_PILE_CNT=1), the 'average' is an average of only one vector, so no averaging calculations are necessary at all.

As described above, the echo canceler 100 in the first embodiment includes a voice detector 8, normal adaptive filter section 6, silent adaptive filter section 17, and adaptive mode controller 10. The voice detector 8 detects the active state and silent state of the voice signal x(n) input by the far-end speaker, and outputs the v_flg control signal, for example, with values of one (v_flg=1) designating the active state and zero (v_flg=0) designating the silent state. The normal adaptive filter section 6 comprises an echo replicator 14 having a coefficient register 14*a*, convolver 14*b*, and data register 14*c*, a normal adapter 15, and switches SW1 to SW3. The silent adaptive filter section 17 comprises a pair of gated data registers 11*r*, 11*s*, a pair of vector averagers 12*r*, 12*s*, a pair of vector registers 13*r*, 13*s*, an adaptation simulator 16, and a subtractor 2, and simulates the adaptation process in the normal adaptive filter section 6 to generate tap coefficients that continue to converge in the silent state. In the single-talk state, under control of the adaptive mode controller 10, when the v_flg control signal is asserted, the normal adaptive filter section 6 adapts when the far-end voice signal is active (v_flg=1), and the silent adaptive filter section 17 adapts when the far-end voice signal is inactive (v_flg=0), subject to further control by the steals_adapt_go control signal and the NOT_SDT flag vector.

The echo canceler 100 additionally includes an averaging controller 1A, echo level detector 1B, timing controller 9, double-talk detector 18, and background noise calculator 19. At an inactive-to-active transition of the v_flg control signal (a transition from v_flg=0 to v_flg=1), the timing controller 9 starts counting at the sampling rate and asserts the KEEP signal until the sample count reaches a predetermined value denoted LENGTH, regardless of further changes of the far-end input signal between the active and silent states. While the KEEP signal is active, gated data register 11r collects and temporarily stores samples of the far-end signal x(n) and generates data vectors from the collected samples, and gated data register 11s collects and temporarily stores samples of the near-end signal y(n) and generates data vectors from the collected samples. When the background noise calculator 19 receives the IDL signal designating the silent state from the double-talk detector 18, it calculates an average power N_POW of the signal output from subtractor 1, representing ambient near-end noise, and supplies the average power N_POW to the averaging controller 1A. When the echo level detector 1B receives the signal ST designating the single-talk state from the double-talk detector 18, it calculates an average power E_POW of the signal received at the sending input terminal Sin 5, which is an echo of the far-end signal, and supplies the average echo power E_POW to the averaging controller 1A. The averaging controller 1A receives the average power N_POW of the ambient noise from the background noise calculator 19 and the average power E_POW of the echo from the echo level detector 1B, and supplies a number AVEL_PILE_CNT to the vector averagers 12r, 12s. Vector averager 12r calculates an averaged vector from the data vectors generated by gated data register 11r. Vector averager 12s calculates an averaged vector from the data vectors generated by gated data register 11s. The number of vectors averaged in each case is AVEL_PILE_CNT. Each time the averaging process is completed, vector averager 12r asserts the steals_adapt_go control signal (steals_adapt_go=1), indicating to the adaptive mode controller 10 that preparations for updating the tap coefficients in the silent state are complete. Vector register 13r receives and stores the averaged vector generated in vector averager 12r. Vector register 13s receives and stores the averaged vector generated in vector averager 12s. The adaptation simulator 16 convolves the averaged data vector stored in vector register 13r with an internally stored coefficient vector to generate a simulated echo replica signal. Subtractor 2 subtracts the simulated echo replica signal from the averaged vector stored in vector register 13s to generate a simulated residual signal, which is sent to the adaptation simulator 16. The adaptation simulator 16 updates the coefficient vector, and supplies the updated coefficient vector to the normal adaptive filter section 6. When the silent adapter 16d in the adaptation simulator 16 receives a NOT_SDT vector from the update controller 16e indicating that usable averaged data are available, it updates the coefficient vector W(m) to a vector W(m+1), using the averaged vector data for which the corresponding NOT_SDT flags are set to '1' the. The adaptation simulator 16d does not use averaged vector data including data collected in the double-talk state as detected by the double-talk detector 18, for which the corresponding NOT_SDT flags are set to '0'.

As described above, according to the first embodiment, in the silent state, while the normal adaptive filter section 6 is halted, the silent adaptive filter section 17 simulates the adaptation process in the normal adaptive filter section 6, using simulated input signals obtained by averaging stored data vectors, to generate tap coefficients that continue to converge. When the active state resumes, these tap coefficients provide a starting point from which the normal adaptive filter section 6 can adapt and converge quickly without the need for computationally expensive high-speed algorithms of uncertain stability. The echo component is therefore removed rapidly and reliably without an increased computational load.

Second Embodiment

Figure 7:
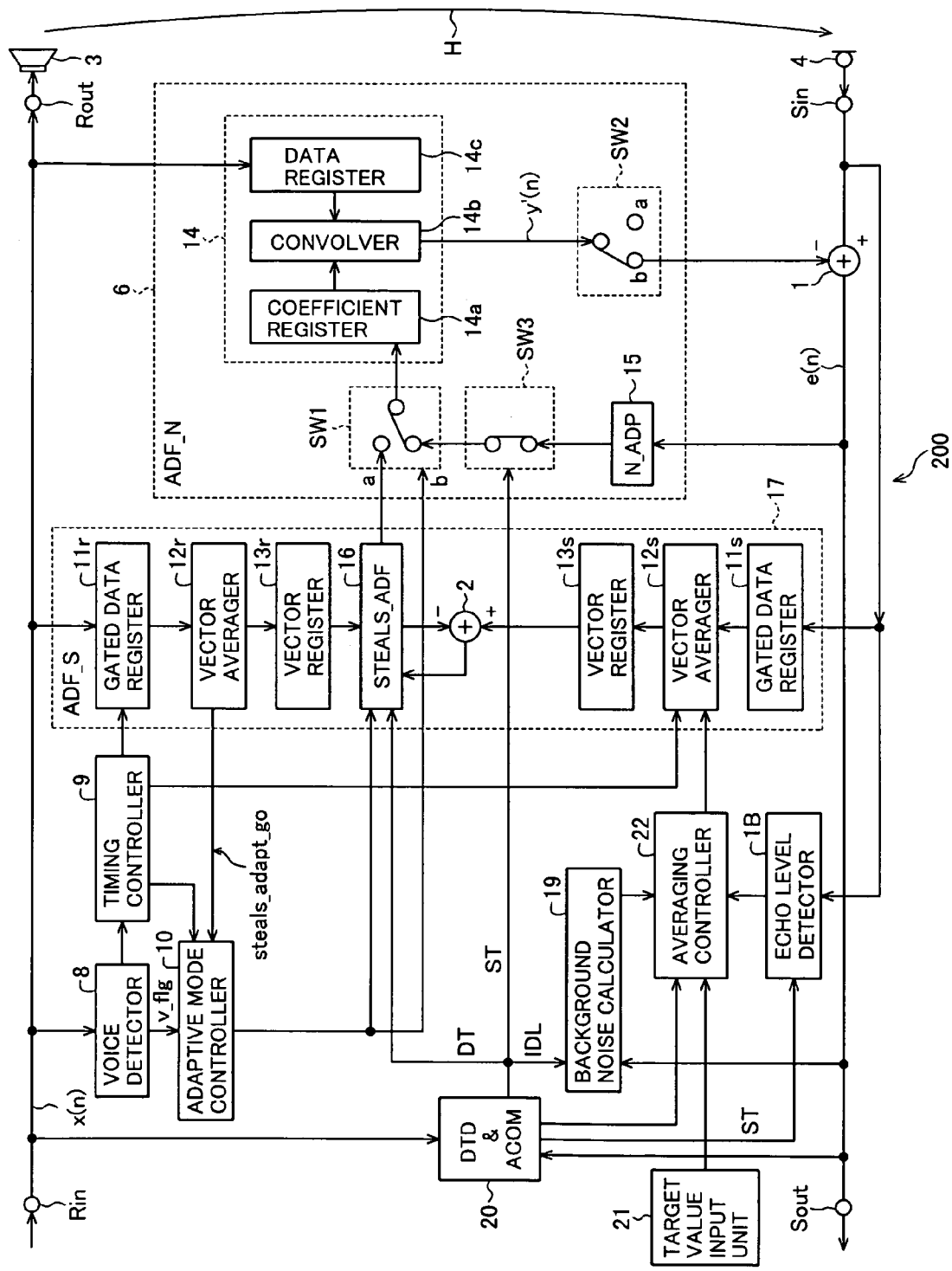
FIG. 7 is a block diagram illustrating the internal structure of an echo canceler according to a second embodiment.

Referring to the block diagram in FIG. 7, the echo canceler 200 in the second embodiment differs from the echo canceler 100 in the first embodiment by including a modified double-talk detector (DTD & ACOM) 20, a modified averaging controller 22, and a target value input unit 21.

The operation of the double-talk detector 20 in the second embodiment differs from the operation of the double-talk detector 18 in the first embodiment in that the double-talk detector 20, besides detecting the silent state, the double-talk state, and the single-talk state, also calculates an average echo attenuation. This calculation is performed in the single-talk state, when only the far-end voice signal x(n) is present. The double-talk detector 20 calculates a time average, more precisely an exponential moving average, of the decibel ratio of the far-end input signal x(n) to the residual signal e(n) by the following equation (23) and sends the resulting average echo attenuation value ACOM(n) to the averaging controller 22.

$$ACOM(n)=\delta \cdot ACOM(n-1)+(1.0-\delta) \cdot 20 \log|x(n)/\text{res}(n)| \quad (23)$$

A predetermined target echo attenuation value TGT_ACOM is set in the target value input unit 21. A typical appropriate value is 30 dB, but the invention is not limited to this or any other particular value.

When the averaging controller 22 receives the target echo attenuation TGT_ACOM from the target value input unit 21 and the average attenuation ACOM(n) from the double-talk detector 20, if the target echo attenuation TGT_ACOM is equal to or greater than the average attenuation ACOM(n) (if TGT_ACOM≧ACOM(n)), the averaging controller 22 sets the number AVEL_PILE_CNT to the value given by the following equation (24).

$$\text{AVEL\_PILE\_CNT}=\text{int}\{(\text{TGT\_ACOM}-\text{ACOM}(n))/6\} \quad (24)$$

In equation (24), the int{ } function converts the value inside the braces to an integer.

In equation (24), when the difference between the target echo attenuation TGT_ACOM and the average attenuation ACOM(n) increases by 6 dB, the number AVEL_PILE_CNT increases by one. If, for example, the target echo attenuation TGT_ACOM is equal to the average attenuation ACOM(n) (TGT_ACOM=ACOM(n)), no averaging process is performed. If the difference between TGT_ACOM and ACOM (n) is 12 dB (TGT_ACOM−ACOM(n)=12), AVEL_PILE_CNT is two (AVEL_PILE_CNT=2). AVEL_PILE_CNT must be equal to or less than the maximum number FULL_PILE, however (AVEL_PILE_CNT≦FULL_PILE).

The averaging controller 22 may also use the inputs it receives from the background noise calculator 19 and echo level detector 1B, but these inputs are already reflected in the average attenuation value ACOM(n) calculated by the double-talk detector 20. The ambient noise level is reflected in the input to the double-talk detector 20 from the sending side (from subtractor 1) and the echo level is reflected because the ACOM(n) value is the ratio of the receiving-side input to the double-talk detector 20 to the sending-side input to the double-talk detector 20. If necessary, accordingly, the echo level detector 1B and background noise calculator 19 may be omitted in order to reduce the circuit size and the averaging controller 22 may operate only according to the inputs received from the double-talk detector 20 and target value input unit 21.

In the first embodiment, the number AVEL_PILE_CNT has a value predetermined according to the echo-to-noise ratio E/N as illustrated in Table 1, but the exemplary values in Table 1 are not always the best values for the environment in which the echo canceler 100 actually operates. Determining the best values requires the skills of an experienced echo canceler designer, who must also take time to evaluate the user's environment.

The echo canceler 200 in the second embodiment differs from the echo canceler 100 in the first embodiment in that the designer only has to set the desired target echo attenuation in the target value input unit 21. The averaging controller 22 receives the set target echo attenuation TGT_ACOM from the target value input unit 21, receives the calculated actual average echo attenuation ACOM(n) from the double-talk detector 20, and calculates the appropriate value of AVEL_PILE_CNT from ACOM(n) and TGT_ACOM as in the above equation (24). The AVEL_PILE_CNT value is then used as in the first embodiment to simulate the operation of the normal adaptive filter section 6 during silent intervals.

The second embodiment accordingly provides the same effects as the first embodiment, but also adapts the number of vectors averaged in the simulation process (the number AVEL_PILE_CNT) according to a single target echo attenuation value (TGT_ACOM) that can easily be set by the circuit designer, or even by the user, according to the ambient noise environment, instead of using a table of values that are more difficult to determine appropriately.

Third Embodiment

Figure 8:
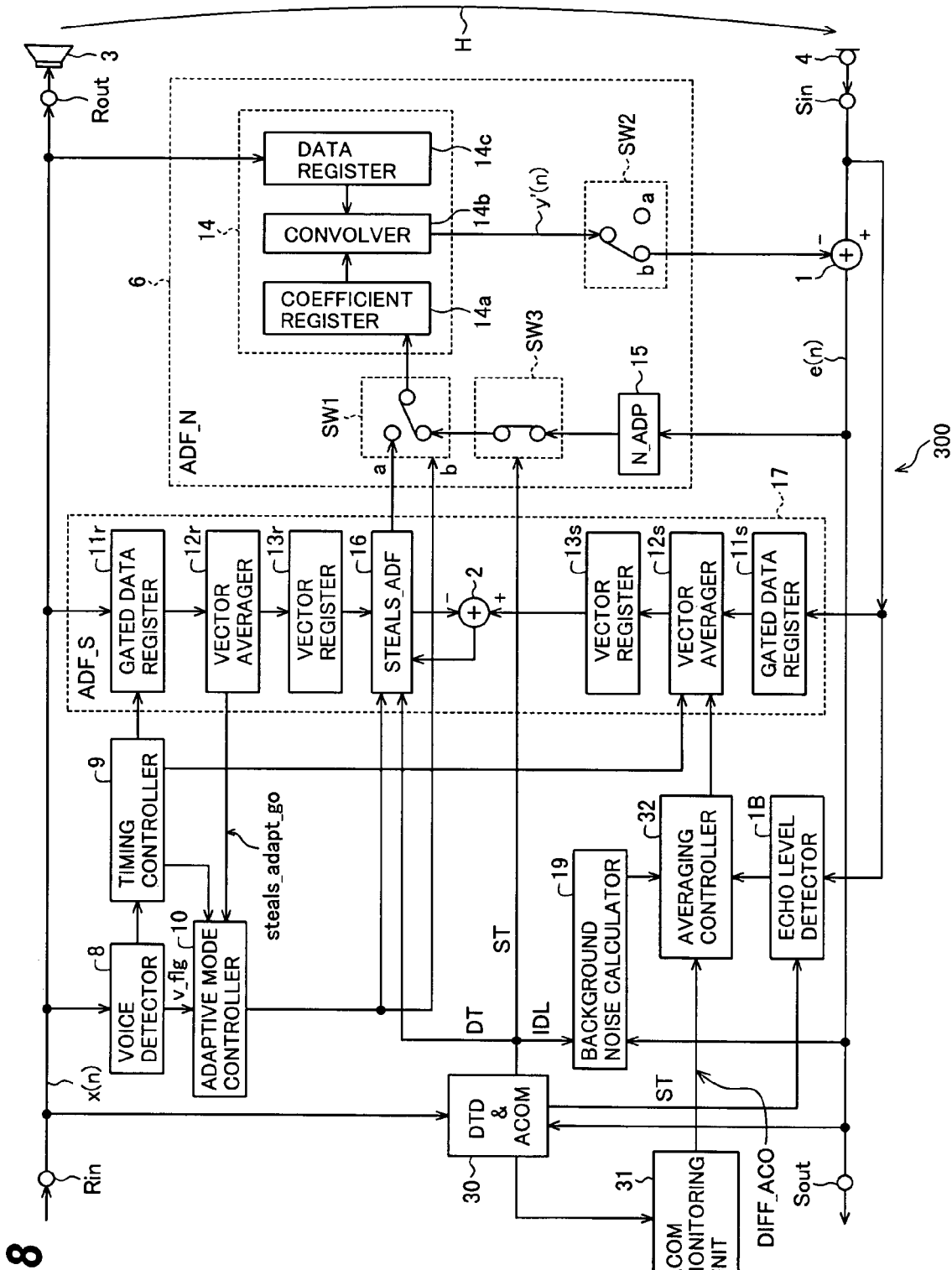
FIG. 8 is a block diagram illustrating the internal structure of an echo canceler according to a third embodiment.

Referring to the block diagram in FIG. 8, the echo canceler 300 in the third embodiment differs from the echo canceler 200 in the second embodiment by including a modified double-talk detector 30, a modified averaging controller 32, and an attenuation (ACOM) monitoring unit 31 instead of the target value input unit 21.

The operation of the double-talk detector 30 in the third embodiment differs from the operation of the double-talk detector 20 in the second embodiment in that the double-talk detector 30 sends the average attenuation ACOM(n) calculated by equation (17) to the attenuation monitoring unit 31.

In the third embodiment, the attenuation monitoring unit 31 stores the average attenuation values ACOM(n) for the predetermined period (LENGTH), calculates the average value AV_ACOM of the stored ACOM(n) values, takes the difference DIFF_ACOM between the resulting average value AV_ACOM and the average value AV_ACOM_OLD calculated as the value of AV_ACOM in the preceding predetermined period, and sends the resulting difference DIFF_ACOM to the averaging controller 32.

If the difference DIFF_ACOM exceeds 0 dB (DIFF_ACOM>0 dB), the average echo attenuation value has increased for the most recent period of the prescribed length of time (LENGTH), so the control of the number AVEL_PILE_CNT most recently performed by the averaging controller 32 has been effective in increasing the average echo attenuation value.

If the difference DIFF_ACOM is equal to or less than 0 dB (DIFF_ACOM≦0 dB), the average echo attenuation value remains unchanged or has decreased, so the control of the number AVEL_PILE_CNT most recently performed by the averaging controller 32 has not been effective in increasing the average echo attenuation value.

Accordingly, the difference value DIFF_ACOM (positive, zero, or negative) indicates whether the averaging controller 32 has controlled the number AVEL_PILE_CNT successfully.

At the start of operations, the averaging controller 32 initializes the number AVEL_PILE_CNT to one (AVEL_PILE_CNT=1).

The difference value DIFF_ACOM indicating whether the most recent change in the number AVEL_PILE_CNT has increased the average echo attenuation value is sent from the attenuation monitoring unit 31 to the averaging controller 32, which calculates the number AVEL_PILE_CNT for the next predetermined period of time according to Table 3. Each time the averaging controller 32 receives the difference value DIFF_ACOM, it calculates AVEL_PILE_CNT for the next period of time (LENGTH).

TABLE 3

Action taken on AVEL_PILE_CNT according to difference DIFF_ACOM

| | DIFF_ACOM value | AVEL_PILE_CNT value |
|---|---|---|
| Condition 1 | $\delta 2 \leqq$ DIFF_ACOM | AVEL_PILE_CNT increases by one. No change if AVEL_PILE_CNT is equal to FULL_PILE (AVEL_PILE_CNT = FULL_PILE). |
| Condition 2 | $-\delta 3 <$ DIFF_ACOM $< \delta 2$ | No change |
| Condition 3 | DIFF_ACOM $< -\delta 3$ | AVEL_PILE_CNT decreases by one. No change if AVEL_PILE_CNT is equal to one (AVEL_PILE_CNT = 1). |

As noted above, the number AVEL_PILE_CNT is initialized to one (AVEL_PILE_CNT=1). Because the echo canceler algorithm always converges, even without the averaging process, in the first and second decisions following initialization, the difference DIFF_ACOM always exceeds zero (DIFF_ACOM>0 dB), so it is assumed that condition 1 is met.

The first decision therefore always changes AVEL_PILE_CNT to two (AVEL_PILE_CNT=2). In the following decisions, the averaging controller 32 calculates the number AVEL_PILE_CNT according to the conditions given in Table 3.

As long as increasing the number AVEL_PILE_CNT produces a positive effect of δ2 or greater, the averaging controller 32 keeps increasing the number AVEL_PILE_CNT one by one up to the maximum number FULL_PILE. When increasing the number AVEL_PILE_CNT produces little or no effect, the averaging controller 32 holds the present number AVEL_PILE_CNT. If increasing the number AVEL_PILE_CNT produces a negative effect greater than δ3, the averaging controller 32 decreases the value of AVEL_PILE_CNT.

Typical appropriate values of δ2 and δ3 are 6 dB, but the invention is not limited to these or any other particular values.

Typical examples under which conditions 1 to 3 are met will now be described.

Condition 1 tends to be met in the presence of ambient noise. A primary object of the third embodiment is to improve echo attenuation in the presence of ambient noise by increasing the value of AVEL_PILE_CNT.

Condition 2 frequently occurs when, due to lack of hardware resources (inadequate memory for storing coefficients), the number of tap coefficients in the adaptive filter is insufficient for the length of the echo path, which is determined by external physical factors. Under this condition, changing the value of AVEL_PILE_CNT produces almost no effect, so there is no point in performing more averaging calculations. Instead, it is the memory allocation that needs to be changed.

Condition 3 frequently occurs due to a time-varying echo path. To adapt to the changing echo path it is necessary to use only the most recently collected data. Condition 3 indicates that the averaging calculations include data vectors that have outlived their usefulness; it would be better not to include them in the averaging calculations, or not to perform any averaging calculations at all.

The averaging controller 32 may also use the inputs it receives from the background noise calculator 19 and echo level detector 1B, but as explained in the second embodiment, these inputs are already reflected in the average attenuation value ACOM(n) calculated by the double-talk detector 30, and the ACOM(n) value is reflected in the difference value DIFF_ACOM calculated by the attenuation monitoring unit 31. If necessary, the echo level detector 1B and background noise calculator 19 may be omitted in order to reduce the circuit size and the averaging controller 32 may operate only according to the input received from the attenuation monitoring unit 31.

The second embodiment adapts the number of vectors averaged in the simulation process (the number AVEL_PILE_CNT) according to a single target echo attenuation value (TGT_ACOM) that even the user can set according to the ambient noise environment, instead of using a table of values that must be tailored to each user's environment by an experienced communications engineer.

Users are generally unfamiliar with communications engineering, however, and may not understand how to change the large target echo attenuation (TGT_ACOM) set in the factory to a smaller value appropriate for their own environment. Continued use of the large factory setting of the TGT_ACOM value results in less than optimal performance. In addition, since a long averaging time increases the data storage time, the second embodiment may converge slowly.

The echo canceler 300 in the third embodiment differs from the echo canceler 200 in the second embodiment in that the double-talk detector 30 sends the calculated average attenuation value ACOM(n) to the attenuation monitoring unit 31. The attenuation monitoring unit 31 stores the average attenuation values ACOM(n) for the predetermined period (LENGTH) of time, calculates the average value AV_ACOM of the stored ACOM(n) values, calculates the difference DIFF_ACOM between this average value AV_ACOM and the preceding average value AV_ACOM_OLD, and sends the resulting difference DIFF_ACOM to the averaging controller 32. The averaging controller 32 adjusts the number AVEL_PILE_CNT according to the difference value DIFF_ACOM received from the attenuation monitoring unit 31 by using the predetermined threshold values $\delta 2$ and $\delta 3$ as described below, keeping the value of AVEL_PILE_CNT between its initial value of one and its maximum value FULL_PILE ($1 \leq$ AVEL_PILE_CNT $\leq$ FULL_PILE).

When the threshold value $\delta 2$ is equal to or less than the difference value DIFF_ACOM ($\delta 2 \leq$ DIFF_ACOM), the averaging controller 32 increases the number AVEL_PILE_CNT by one.

When the difference value DIFF_ACOM is greater than the threshold value $-\delta 3$ and less than the threshold value $\delta 2$ ($-\delta 3 <$ DIFF_ACOM $< \delta 2$), the averaging controller 32 holds the present value of AVEL_PILE_CNT.

When the difference value DIFF_ACOM is less than the threshold value $-\delta 3$ (DIFF_ACOM $< -\delta 3$), the averaging controller 32 decreases the number AVEL_PILE_CNT by one.

When the echo canceler 300 starts adapting and converging, the double-talk detector 30, besides detecting the silent state, the double-talk state, and the single-talk state, also calculates the average echo attenuation value ACOM(n), which is sent to the attenuation monitoring unit 31. The attenuation monitoring unit 31 calculates the difference DIFF_ACOM between the average value AV_ACOM and the average value AV_ACOM_OLD, and sends the resulting difference DIFF_ACOM to the averaging controller 32. The averaging controller 32 calculates the number AVEL_PILE_CNT according to the difference value DIFF_ACOM.

The third embodiment accordingly provides the same effects as the first and second embodiments, but also adapts the number of vectors averaged in the simulation process (the number AVEL_PILE_CNT) according to the difference DIFF_ACOM, so that the number AVEL_PILE_CNT can effectively be set by the averaging controller 32, instead of being set according to a target value that the user may not know how to optimize.

The echo cancelers 100, 200, 300 described in the first, second, and third embodiments may be implemented by software. More specifically, hardware including a central processing unit (CPU), read-only memory (ROM), and random-access memory (RAM) may be provided, and a program that, when executed by the CPU, implements one of the echo canceling processes described above may be stored in the ROM.

A few variations of the preceding embodiments have already been mentioned, but those skilled in the art will recognize that further variations are possible within the scope of the invention, which is defined in the appended claims.

What is claimed is:

1. An echo canceler for generating an echo replica signal from a far-end input signal and using the echo replica signal to remove an echo component included in a near-end input signal, thereby obtaining a near-end output signal, the echo canceler comprising:
   a voice detector for detecting an active state and a silent state of the far-end input signal;
   a double-talk detector for detecting a single-talk state, a double-talk state, and a silent state from the far-end input signal and the near-end output signal;
   a normal adaptive filter section that operates while the far-end input signal is active;
   a silent adaptive filter section for that operates while the far-end input signal is inactive;
   an adaptive mode controller for controlling operations of the normal adaptive filter section and the silent adaptive filter section on the basis of the active state and the silent state of the far-end input signal as detected by the voice detector;
   a background noise calculator for calculating an ambient near-end noise power from the near-end output signal when the silent state is detected by the double-talk detector;
   an echo level detector for detecting an echo power from the near-end output signal when the single-talk state is detected by the double-talk detector; and
   an averaging controller for calculating a number of vectors to be averaged from an average value of the ambient near-end noise power calculated by the background noise calculator and an average value of the echo power detected by the echo level detector, wherein the silent adaptive filter section includes a data selector for sampling the near-end input signal and the far-end input signal at prescribed intervals for a prescribed duration starting from a time when the voice detector detects a transition from the silent state to the active state to obtain samples, temporarily storing the samples, and generating data vectors from the stored samples, a vector averager for averaging the number of data vectors designated by the averaging controller to generate an averaged far-end input vector and an averaged near-end input vector, an adaptive filter section for convolving the averaged far-end input vector calculated by the vector averager with an internally stored coefficient vector to generate a simulated echo replica signal, subtracting the simulated echo replica signal from the averaged near-end input vector, updating the internally stored coefficient vector, and supplying the updated coefficient vector to the normal adaptive filter section, and an update controller for halting updating of the internally stored coefficient vector in the silent adaptive filter section in the double-talk state, and wherein the averaging controller has a table of ratios of the average ambient near-end noise power to the average echo power and corresponding predetermined values of the number of vectors to be averaged, and obtains the number of vectors to be averaged by referring to the table.

2. The echo canceler of claim 1, wherein the number of vectors to be averaged increases as the ratio of the average ambient near-end noise power to the average echo power decreases.

3. An echo canceler for generating an echo replica signal from a far-end input signal and using the echo replica signal to remove an echo component included in a near-end input signal, thereby obtaining a near-end output signal, the echo canceler comprising:
   a voice detector for detecting an active state and a silent state of the far-end input signal;
   a double-talk detector for detecting a single-talk state, a double-talk state, and a silent state from the far-end input signal and the near-end output signal;
   a normal adaptive filter section that operates while the far-end input signal is active;
   a silent adaptive filter section for that operates while the far-end input signal is inactive;
   an adaptive mode controller for controlling operations of the normal adaptive filter section and the silent adaptive filter section on the basis of the active state and the silent state of the far-end input signal as detected by the voice detector;
   a background noise calculator for calculating an ambient near-end noise power from the near-end output signal when the silent state is detected by the double-talk detector;
   an echo level detector for detecting an echo power from the near-end output signal when the single-talk state is detected by the double-talk detector;
   an averaging controller for calculating a number of vectors to be averaged from an average value of the ambient near-end noise power calculated by the background noise calculator and an average value of the echo power detected by the echo level detector, wherein
      the silent adaptive filter section includes a data selector for sampling the near-end input signal and the far-end input signal at prescribed intervals for a prescribed duration starting from a time when the voice detector detects a transition from the silent state to the active state to obtain samples, temporarily storing the samples, and generating data vectors from the stored samples, a vector averager for averaging the number of data vectors designated by the averaging controller to generate an averaged far-end input vector and an averaged near-end input vector, an adaptive filter section for convolving the averaged far-end input vector calculated by the vector averager with an internally stored coefficient vector to generate a simulated echo replica signal, subtracting the simulated echo replica signal from the averaged near-end input vector, updating the internally stored coefficient vector, and supplying the updated coefficient vector to the normal adaptive filter section, and an update controller for halting updating of the internally stored coefficient vector in the silent adaptive filter section in the double-talk state; and
   a target value input unit for input and storage of a target echo attenuation value, wherein
      the double-talk detector also calculates an average echo attenuation from a residual signal generated by the normal adaptive filter section and the far-end input signal in the single-talk state, and
      the averaging controller obtains the number of vectors to be averaged from the average echo attenuation calculated by the double-talk detector and the target echo attenuation value.

4. The echo canceler of claim 3, wherein the number of vectors to be averaged increases as a difference between the average echo attenuation calculated by the double-talk detector and the target echo attenuation value increases.

5. An echo canceler for generating an echo replica signal from a far-end input signal and using the echo replica signal to remove an echo component included in a near-end input signal, thereby obtaining a near-end output signal, the echo canceler comprising:
   a voice detector for detecting an active state and a silent state of the far-end input signal;
   a double-talk detector for detecting a single-talk state, a double-talk state, and a silent state from the far-end input signal and the near-end output signal;
   a normal adaptive filter section that operates while the far-end input signal is active;
   a silent adaptive filter section for that operates while the far-end input signal is inactive;
   an adaptive mode controller for controlling operations of the normal adaptive filter section and the silent adaptive filter section on the basis of the active state and the silent state of the far-end input signal as detected by the voice detector;
   a background noise calculator for calculating an ambient near-end noise power from the near-end output signal when the silent state is detected by the double-talk detector;
   an echo level detector for detecting an echo power from the near-end output signal when the single-talk state is detected by the double-talk detector;
   an averaging controller for calculating a number of vectors to be averaged from an average value of the ambient near-end noise power calculated by the background noise calculator and an average value of the echo power detected by the echo level detector, wherein
      the silent adaptive filter section includes a data selector for sampling the near-end input signal and the far-end input signal at prescribed intervals for a prescribed duration starting from a time when the voice detector detects a transition from the silent state to the active state to obtain samples, temporarily storing the samples, and generating data vectors from the stored samples, a vector averager for averaging the number of data vectors designated by the averaging controller to generate an averaged far-end input vector and an averaged near-end input vector, an adaptive filter section for convolving the averaged far-end input vector calculated by the vector averager with an internally stored coefficient vector to generate a simulated echo replica signal, subtracting the simulated echo replica signal from the averaged near-end input vector, updating the internally stored coefficient vector, and supplying the updated coefficient vector to the normal adaptive filter section, and an update controller for halting updating of the internally stored coefficient vector in the silent adaptive filter section in the double-talk state; and an attenuation monitoring unit wherein the double-talk detector also repeatedly calculates an average echo attenuation from a residual signal generated by the normal adaptive filter section and the far-end input signal in the single-talk state; and the attenuation monitoring unit calculates a difference between average echo attenuations calculated successively by the double-talk detector; and the averaging controller obtains the number of vectors to be averaged from the difference calculated by the attenuation monitoring unit.

6. The echo canceler of claim 5, wherein the averaging controller obtains the number of vectors to be averaged by comparing the difference calculated by the attenuation monitoring unit with a plurality of predetermined threshold values.

7. The echo canceler of claim 6, wherein the plurality of predetermined threshold values include a positive threshold and a negative threshold, and the averaging controller increases the number of vectors to be averaged if said difference is greater than the positive threshold, decreases the number of vectors to be averaged if said difference is less than the negative threshold, and leaves the number of vectors to be averaged unchanged if said difference is between the positive threshold and the negative threshold.

8. The echo canceler of claim 6, wherein the averaging controller initializes the number of vectors to be averaged to one.

9. An echo canceler for generating an echo replica signal from a far-end input signal and using the echo replica signal to remove an echo component included in a near-end input signal, thereby obtaining a near-end output signal, the echo canceler comprising:

a voice detector for detecting an active state and a silent state of the far-end input signal;

a double-talk detector for detecting a single-talk state, a double-talk state, and a silent state from the far-end input signal and the near-end output signal;

a normal adaptive filter section that operates while the far-end input signal is active;

a silent adaptive filter section for that operates while the far-end input signal is inactive;

an adaptive mode controller for controlling operations of the normal adaptive filter section and the silent adaptive filter section on the basis of the active state and the silent state of the far-end input signal as detected by the voice detector;

a background noise calculator for calculating an ambient near-end noise power from the near-end output signal when the silent state is detected by the double-talk detector;

an echo level detector for detecting an echo power from the near-end output signal when the single-talk state is detected by the double-talk detector; and an averaging controller for calculating a number of vectors to be averaged from an average value of the ambient near-end noise power calculated by the background noise calculator and an average value of the echo power detected by the echo level detector, wherein the silent adaptive filter section includes a data selector for sampling the near-end input signal and the far-end input signal at prescribed intervals for a prescribed duration starting from a time when the voice detector detects a transition from the silent state to the active state to obtain samples, temporarily storing the samples, and generating data vectors from the stored samples, a vector averager for averaging the number of data vectors designated by the averaging controller to generate an averaged far-end input vector and an averaged near-end input vector, an adaptive filter section for convolving the averaged far-end input vector calculated by the vector averager with an internally stored coefficient vector to generate a simulated echo replica signal, subtracting the simulated echo replica signal from the averaged near-end input vector, updating the internally stored coefficient vector, and supplying the updated coefficient vector to the normal adaptive filter section, and an update controller for halting updating of the internally stored coefficient vector in the silent adaptive filter section in the double-talk state, and wherein the vector averager initially averages all data vectors stored by the data selector, until the number of data vectors stored reaches a predetermined number.

10. A method of removing an echo of a far-end input signal from a near-end input signal by generating an echo replica from the far-end input signal and subtracting the echo replica signal from the near-end input signal to obtain a near-end output signal, comprising:

detecting an active state and a silent state of the far-end input signal;

detecting a single-talk state, a double-talk state, and a silent state from the far-end input signal and the near-end output signal;

performing normal adaptive filter operations to generate the echo replica signal while the far-end input signal is active;

performing silent adaptive filter operations to simulate the normal adaptive filter operations while the far-end input signal is inactive;

controlling the normal adaptive filter operations and the silent adaptive filter operations according to the active state and the silent state;

calculating an ambient near-end noise power from the near-end output signal when the silent state is detected;

detecting an echo power from the near-end output signal when the single-talk state is detected;

calculating a number of vectors to be averaged from an average value of the ambient near-end noise power and an average value of the echo power;

wherein the silent adaptive filter operations include sampling the near-end input signal and the far-end input signal at prescribed intervals for a prescribed duration starting from a transition from the silent state to the active state to obtain samples, storing the samples temporarily, generating data vectors from the samples, averaging the calculated number of data vectors to be averaged to generate an averaged far-end input vector and an averaged near-end input vector convolving the averaged far-end input vector with a coefficient vector to generate a simulated echo replica signal, subtracting the simulated echo replica signal from the averaged near-end input vector to obtain a simulated residual signal, updating the coefficient vector according to the simulated residual signal, supplying the updated coefficient vector for use in the normal adaptive filter operations, and halting updating of the coefficient vector in the double-talk state; and providing a table of ratios of the average ambient near-end noise power to the average echo power and corresponding predetermined values of the number of vectors to be averaged, wherein calculating the number of vectors to be averaged comprises referring to the table.

11. The method of claim 10, wherein the number of vectors to be averaged increases as the ratio of the average ambient near-end noise power to the average echo power decreases.

12. A method of removing an echo of a far-end input signal from a near-end input signal by generating an echo replica from the far-end input signal and subtracting the echo replica signal from the near-end input signal to obtain a near-end output signal, comprising:

detecting an active state and a silent state of the far-end input signal;

detecting a single-talk state, a double-talk state, and a silent state from the far-end input signal and the near-end output signal;

performing normal adaptive filter operations to generate the echo replica signal while the far-end input signal is active;

performing silent adaptive filter operations to simulate the normal adaptive filter operations while the far-end input signal is inactive;

controlling the normal adaptive filter operations and the silent adaptive filter operations according to the active state and the silent state;

calculating an ambient near-end noise power from the near-end output signal when the silent state is detected;

detecting an echo power from the near-end output signal when the single-talk state is detected;

calculating a number of vectors to be averaged from an average value of the ambient near-end noise power and an average value of the echo power;

wherein the silent adaptive filter operations include sampling the near-end input signal and the far-end input signal at prescribed intervals for a prescribed duration starting from a transition from the silent state to the active state to obtain samples, storing the samples temporarily, generating data vectors from the samples, averaging the calculated number of data vectors to be averaged to generate an averaged far-end input vector and an averaged near-end input vector convolving the averaged far-end input vector with a coefficient vector to generate a simulated echo replica signal, subtracting the simulated echo replica signal from the averaged near-end input vector to obtain a simulated residual signal, updating the coefficient vector according to the simulated residual signal, supplying the updated coefficient vector for use in the normal adaptive filter operations, and halting updating of the coefficient vector in the double-talk state; and entering a target echo attenuation value; and calculating an average echo attenuation from a residual signal generated by the normal adaptive filter operations and the far-end input signal in the single-talk state;

wherein the number of vectors to be averaged is calculated from the average echo attenuation and the target echo attenuation value.

13. The method of claim 12, wherein the number of vectors to be averaged increases as a difference between the average echo attenuation and the target echo attenuation value increases.

14. A method of removing an echo of a far-end input signal from a near-end input signal by generating an echo replica from the far-end input signal and subtracting the echo replica signal from the near-end input signal to obtain a near-end output signal, comprising:

detecting an active state and a silent state of the far-end input signal;

detecting a single-talk state, a double-talk state, and a silent state from the far-end input signal and the near-end output signal;

performing normal adaptive filter operations to generate the echo replica signal while the far-end input signal is active;

performing silent adaptive filter operations to simulate the normal adaptive filter operations while the far-end input signal is inactive;

controlling the normal adaptive filter operations and the silent adaptive filter operations according to the active state and the silent state;

calculating an ambient near-end noise power from the near-end output signal when the silent state is detected;

detecting an echo power from the near-end output signal when the single-talk state is detected;

calculating a number of vectors to be averaged from an average value of the ambient near-end noise power and an average value of the echo power;

wherein the silent adaptive filter operations include sampling the near-end input signal and the far-end input signal at prescribed intervals for a prescribed duration starting from a transition from the silent state to the active state to obtain samples, storing the samples temporarily, generating data vectors from the samples, averaging the calculated number of data vectors to be averaged to generate an averaged far-end input vector and an averaged near-end input vector convolving the averaged far-end input vector with a coefficient vector to generate a simulated echo replica signal, subtracting the simulated echo replica signal from the averaged near-end input vector to obtain a simulated residual signal, updating the coefficient vector according to the simulated residual signal, supplying the updated coefficient vector for use in the normal adaptive filter operations, and halting updating of the coefficient vector in the double-talk state;

repeatedly calculating an average echo attenuation from a residual signal generated by the normal adaptive filter operations and the far-end input signal in the single-talk state; and calculating a difference between successively calculated average echo attenuations;

wherein the number of vectors to be averaged is calculated from said difference.

15. The method of claim 14, wherein calculating the number of vectors to be averaged further comprises comparing said difference with a plurality of predetermined threshold values.

16. The method of claim 15, wherein the plurality of predetermined threshold values include a positive threshold and a negative threshold, and calculating the number of vectors to be averaged further comprises;

increasing the number of vectors to be averaged if said difference is greater than the positive threshold;

decreasing the number of vectors to be averaged if said difference is less than the negative threshold; and leaving the number of vectors to be averaged unchanged if said difference is between the positive threshold and the negative threshold.

17. The method of claim 15, further comprising initializing the number of vectors to be averaged to one.

18. A non-transitory machine-readable tangible medium storing a program executable by a computing device to remove an echo of a far-end input signal from a near-end input signal by generating an echo replica from the far-end input signal and subtracting the echo replica signal from the near-end input signal to obtain a near-end output signal, the program comprising instructions for:

detecting an active state and a silent state of the far-end input signal;

detecting a single-talk state, a double-talk state, and a silent state from the far-end input signal and the near-end output signal;

performing normal adaptive filter operations to generate the echo replica signal while the far-end input signal is active;

performing silent adaptive filter operations to simulate the normal adaptive filter operations while the far-end input signal is inactive;

controlling the normal adaptive filter operations and the silent adaptive filter operations according to the active state and the silent state;

calculating an ambient near-end noise power from the near-end output signal when the silent state is detected;

detecting an echo power from the near-end output signal when the single-talk state is detected;

calculating a number of vectors to be averaged from an average value of the ambient near-end noise power and an average value of the echo power;

wherein the silent adaptive filter operations include sampling the near-end input signal and the far-end input signal at prescribed intervals for a prescribed duration starting from a transition from the silent state to the active state to obtain samples, storing the samples temporarily, generating data vectors from the samples, averaging the calculated number of data vectors to be averaged to generate an averaged far-end input vector and an averaged near-end input vector, convolving the averaged far-end input vector with a coefficient vector to generate a simulated echo replica signal, subtracting the simulated echo replica signal from the averaged near-end input vector to obtain a simulated residual signal, updating the coefficient vector according to the simulated residual signal, supplying the updated coefficient vector for use in the normal adaptive filter operations, and halting updating of the coefficient vector in the double-talk state; and providing a table of ratios of the average ambient near-end noise power to the average echo power and corresponding predetermined values of the number of vectors to be averaged, wherein calculating the number of vectors to be averaged comprises referring to the table.

19. A non-transitory machine-readable tangible medium storing a program executable by a computing device to remove an echo of a far-end input signal from a near-end input signal by generating an echo replica from the far-end input signal and subtracting the echo replica signal from the near-end input signal to obtain a near-end output signal, the program comprising instructions for:

detecting an active state and a silent state of the far-end input signal;

detecting a single-talk state, a double-talk state, and a silent state from the far-end input signal and the near-end output signal;

performing normal adaptive filter operations to generate the echo replica signal while the far-end input signal is active;

performing silent adaptive filter operations to simulate the normal adaptive filter operations while the far-end input signal is inactive;

controlling the normal adaptive filter operations and the silent adaptive filter operations according to the active state and the silent state;

calculating an ambient near-end noise power from the near-end output signal when the silent state is detected;

detecting an echo power from the near-end output signal when the single-talk state is detected;

calculating a number of vectors to be averaged from an average value of the ambient near-end noise power and an average value of the echo power;

wherein the silent adaptive filter operations include sampling the near-end input signal and the far-end input signal at prescribed intervals for a prescribed duration starting from a transition from the silent state to the active state to obtain samples, storing the samples temporarily, generating data vectors from the samples, averaging the calculated number of data vectors to be averaged to generate an averaged far-end input vector and an averaged near-end input vector, convolving the averaged far-end input vector with a coefficient vector to generate a simulated echo replica signal, subtracting the simulated echo replica signal from the averaged near-end input vector to obtain a simulated residual signal, updating the coefficient vector according to the simulated residual signal, and supplying the updated coefficient vector for use in the normal adaptive filter operations;

halting updating of the coefficient vector in the double-talk state;

entering a target echo attenuation value; and calculating an average echo attenuation from a residual signal generated by the normal adaptive filter operations and the far-end input signal in the single-talk state;

wherein the number of vectors to be averaged is calculated from the average echo attenuation and the target echo attenuation value.

20. A non-transitory machine-readable tangible medium storing a program executable by a computing device to remove an echo of a far-end input signal from a near-end input signal by generating an echo replica from the far-end input signal and subtracting the echo replica signal from the near-end input signal to obtain a near-end output signal, the program comprising instructions for:

detecting an active state and a silent state of the far-end input signal;

detecting a single-talk state, a double-talk state, and a silent state from the far-end input signal and the near-end output signal;

performing normal adaptive filter operations to generate the echo replica signal while the far-end input signal is active;

performing silent adaptive filter operations to simulate the normal adaptive filter operations while the far-end input signal is inactive;

controlling the normal adaptive filter operations and the silent adaptive filter operations according to the active state and the silent state;

calculating an ambient near-end noise power from the near-end output signal when the silent state is detected;

detecting an echo power from the near-end output signal when the single-talk state is detected;

calculating a number of vectors to be averaged from an average value of the ambient near-end noise power and an average value of the echo power;

wherein the silent adaptive filter operations include sampling the near-end input signal and the far-end input signal at prescribed intervals for a prescribed duration starting from a transition from the silent state to the active state to obtain samples, storing the samples temporarily, generating data vectors from the samples, averaging the calculated number of data vectors to be averaged to generate an averaged far-end input vector and an averaged near-end input vector, convolving the averaged far-end input vector with a coefficient vector to generate a simulated echo replica signal, subtracting the simulated echo replica signal from the averaged near-end input vector to obtain a simulated residual signal, updating the coefficient vector according to the simulated residual signal, and supplying the updated coefficient vector for use in the normal adaptive filter operations;

halting updating of the coefficient vector in the double-talk state;

repeatedly calculating an average echo attenuation from a residual signal generated by the normal adaptive filter operations and the far-end input signal in the single-talk state; and calculating a difference between successively calculated average echo attenuations;

wherein the number of vectors to be averaged is calculated from said difference.

* * * * *